US008250927B2

(12) United States Patent
Anand et al.

(10) Patent No.: US 8,250,927 B2
(45) Date of Patent: Aug. 28, 2012

(54) FLEXIBLE, STRETCHABLE, AND DISTRIBUTED STRAIN SENSORS

(75) Inventors: Sandeep Venkit Anand, Bangalore (IN); Debiprosad Roy Mahapatra, Bangalore (IN)

(73) Assignee: Indian Institute of Science, Bangalore (IN)

( * ) Notice: Subject to any disclaimer, the term of this patent is extended or adjusted under 35 U.S.C. 154(b) by 115 days.

(21) Appl. No.: 12/726,091

(22) Filed: Mar. 17, 2010

(65) Prior Publication Data

US 2011/0226066 A1 Sep. 22, 2011

(51) Int. Cl.
*G01B 7/16* (2006.01)
*G01L 1/00* (2006.01)
(52) U.S. Cl. ............... 73/777; 73/775; 73/774; 73/763
(58) Field of Classification Search .............. 73/763, 73/765, 766, 768, 774–777
See application file for complete search history.

(56) References Cited

U.S. PATENT DOCUMENTS

| | | | |
|---|---|---|---|
| 6,276,214 B1 | 8/2001 | Kimura et al. | |
| 6,848,320 B2 * | 2/2005 | Miyajima et al. | 73/763 |
| 7,194,912 B2 * | 3/2007 | Jordan et al. | 73/774 |
| 7,278,324 B2 * | 10/2007 | Smits et al. | 73/799 |
| 7,500,399 B2 * | 3/2009 | Cheng et al. | 73/777 |
| 7,594,442 B2 * | 9/2009 | Kaiserman et al. | 73/763 |
| 7,673,521 B2 * | 3/2010 | Ajayan et al. | 73/774 |
| 7,854,173 B2 * | 12/2010 | Cheng et al. | 73/774 |
| 7,971,489 B2 * | 7/2011 | Pushparaj et al. | 73/774 |
| 7,975,556 B2 * | 7/2011 | Hatami et al. | 73/788 |
| 2006/0010996 A1 * | 1/2006 | Jordan et al. | 73/866.1 |
| 2006/0253942 A1 | 11/2006 | Barrera et al. | |
| 2007/0084293 A1 * | 4/2007 | Kaiserman et al. | 73/763 |
| 2007/0222472 A1 * | 9/2007 | Raravikar et al. | 324/765 |
| 2009/0007685 A1 * | 1/2009 | Cheng et al. | 73/774 |
| 2009/0293631 A1 * | 12/2009 | Radivojevic | 73/774 |
| 2010/0050779 A1 * | 3/2010 | Pushparaj et al. | 73/774 |
| 2010/0095781 A1 * | 4/2010 | Kinlen et al. | 73/777 |
| 2010/0132476 A1 * | 6/2010 | Cheng et al. | 73/774 |
| 2010/0154556 A1 * | 6/2010 | Yin | 73/779 |
| 2010/0180691 A1 * | 7/2010 | Hatami et al. | 73/788 |

OTHER PUBLICATIONS

Strukov et al. "The Missing Memristor Found". Nature. vol. 453. May 1, 2008. Available online <http://www.nature.com/nature/journal/v453/n7191/pdf/nature06932.pdf> Provided by Applicant.*

(Continued)

*Primary Examiner* — Lisa Caputo
*Assistant Examiner* — Jonathan Dunlap
(74) *Attorney, Agent, or Firm* — McDonnell Boehnen Hulbert & Berghoff LLP

(57) ABSTRACT

Methods and systems for sensing strain are disclosed. A thin film sensor includes a thin film polymer matrix that has two electrical terminals, conductive nanoparticles dispersed within the polymer matrix, and carbon nanotubes dispersed within the polymer matrix. The thin film sensor has a resistivity across the two electrical terminals that varies with a magnitude of strain applied to the thin film sensor. Strain may be sensed by applying a voltage to the thin film sensor, and an electrical response of the thin film sensor may be detected due to a strain present across the sensor. A magnitude of the strain can be determined based on the electrical response. Methods and systems for a memristor are also disclosed. The memristor has a resistivity that varies with a time-varying voltage input and with a time-varying strain input.

15 Claims, 16 Drawing Sheets

OTHER PUBLICATIONS

Gergel-Hackett et al. "A Flexible Solution-Processed Memristor". IEEE Electron Device Letters, vol. 20, No. 7. Jul. 2009. Available online <http://ieeexplore.ieee.org/stamp/stamp.jsp?arnumber=05061634> Provided by Applicant.*

Wichmann et al. "Direction sensitive bending sensors based on multi-wall carbon nanotube/epoxy nanocomposites". Nanotechnology vol. 19. Oct. 29, 2008. Available online <http://iopscience.iop.org/0957-4484/19/47/475503/pdf/0957-4484_19_47_475503.pdf>.*

Anand et al. "Quasi-static and dynamic strain sensing using carbon nanotube/epoxy nanocomposite thin films". Smart Materials and Structures vol. 18. Mar. 18, 2009. Available online <http://iopscience.iop.org/0964-1726/18/4/045013/pdf/sms9_4_045013.pdf>.*

Sumfleth et al. "Synergistic electrical and rheological effects in carbon/nanotube/carbon black-epoxy three phase systems". Seventeenth International Conference on Composite Materials. Jul. 27-31, 2009. Available online <http://www.iccm-central.org/Proceedings/ICCM17proceedings/Themes/Nanocomposites/CARBON%20NANOTUBE%20COMPOSITES/E1.29%20Sumflet>.*

Han et al. "Enhancing the thermal conductivity and compressive modulus of carbon fiber polymer-matrix composites in the through-thickness direction by nanostructuring the interlaminar interface with carbon black" Carbon vol. 46. Apr. 6, 2008. Available online <http://www.sciencedirect.com/science/article/pii/S0008622308001516>.*

Yong et al. "Piezoresistive effect in carbon nanotube films" Chinese Science Bulletin vol. 48, No. 2. pp. 130-132. Jan. 2003. Available online <http://www.springerlink.com/content/9k1225g564083458/>.*

Sun et al. "Modeling of the Electrical Percolation of Mixed Carbon Fillers in Polymer-Based Composites". Macromolecules vol. 42, No. 1. Dec. 16, 2008. Available online <http://pubs.acs.org/doi/abs/10.1021/ma8023188>.*

Wen et al. "Partial replacement of carbon fiber by carbon black in multifunctional cement-matrix composites". Carbon, vol. 45, issue 3. Mar. 2007. pp. 505-513 <http://www.sciencedirect.com/science/article/pii/S0008622306005483>.*

Kang I, Schulz J M, Kim H J, Shanov V and Shi D 2006 A carbon nanotube strain sensor for structural health monitoring Smart Materials and Structures 15 737-748, Apr. 25, 2006.

Yang L, Anantram M P, Han J and Lu J P 1999 Band-gap change of carbon nanotubes: Effect of small uniaxial and torsional strain Physical Review B 60 13874-13879, Nov. 1999.

Paulson S, Falvo M R, Snider N, Heiser A, Hudson T, Seeger A, Taylor R M and Washburn S 1999 In situ resistance measurements of strained carbon nanotubes Applied Physics Letters 75 2936-2938, Nov. 1999.

Shan G and Bao S 2006 The effect of deformations on electronic structures and optical properties of carbon nanotubes Physica E 35 161-167, Sep. 18, 2006.

Jiang H, Zhang Y, Yu G and Dong J The effect of uniaxial and torsional deformations on quantum interference of carbon nanotubes Physics Letters A 351 308-313, Nov. 14, 2005.

Wagner H D, Lourie O, Feldman Y and Tenne R 1998 Stress-induced fragmentation of multiwalled carbon nanotubes in a polymer matrix Applied Physics Letters 72 188-190, Jan. 1998.

Pham T G, Park Y B, Liang Z, Zhang C and Wang B 2008 Processing and modeling of conductive thermoplastic/carbon nanotube films for strain sensing Composites Part B: Engineering 39 209-216, Mar. 12, 2007.

Loh J K, Kim J, Lynch P J, Kam W S N and Kotov A N 2007 Multifunctional layer-by-layer carbon nanotube-polyelectrolyte thin films for strain and corrosion sensing Smart Materials and Structures 16 429-438, Feb. 9, 2007.

Dharap P, Li Z, Nagarajaiah S and Barrera E V 2004 Nanotube film based on single wall carbon nanotubes for strain sensing Nanotechnology 15 379-382, Jan. 13, 2004.

Loh J K, Lynch P J and Kotov A N 2005 Conformable single walled carbon nanotube thin film strain sensors for structural health monitoring Proceedings of the 5th International Workshop on Structural Health Monitoring, Stanford, California, USA, Sep. 12-14, 2005.

Park M, Kim H and Youngblood P J 2008 Strain-dependent electrical resistance of multi-walled carbon nanotube/polymer composite films Nanotechnology 19 55705-55711, Jan. 14, 2008.

Minot E D, Yaish Y, Sazonova V, Park Y J, Brink M and McEuen L P 2003 Tuning carbon nanotube bandgaps with strain Physical Review Letters 90 156401 1-4.

Bruggeman D A G 1935 Calculation of various physical constants in heterogeneous substances. I. Dielectric constants and conductivity of composites from isotropic substances Ann. Phys. 24 636-70.

Landauer R 1952 The electrical resistance of binary metallic mixtures J. Appl. Phys. 23 779-84, Jul. 1952.

Zeller R and Dederichs P H 1973 Elastic constants of polycrystals Phys. Status Solidi b 55 831-42.

Stroud D 1974 Generalized effective-medium approach to the conductivity of an inhomogeneous material Phys. Rev. B 12 3368-73, Oct. 1975.

Kim C and Torquato S 1993 Effective conductivity of composites containing spheroidal inclusions: comparison of simulations with theory J. Appl. Phys. 74 1844-54, Aug. 1, 1993.

Zairi F, Abdelaziz M N, Woznica K and Gloaguen J M 2007 Elasto-viscoplastic constitutive equations for the description of glassy polymers behavior at constant strain rate J. Eng. Mater. Technol. 129 29-35, Jan. 2007.

Boyce C M, Parks M D and Argon S A 1988 Large inelastic deformation of glassy polymers. Part I: rate dependent constitutive model Mech. Mater. 7 15-33.

Hasan O A and Boyce C M 1995 A constitutive model for the nonlinear viscoelastic viscoplastic behavior of glassy polymers Polym. Eng. Sci. 35 331-44, Feb. 1995.

Dommelen JAW, ParksMD, BoyceCM, BrekelmansWAM and Baaijens F P T 2003 Micromechanical modeling of the elasto-viscoplastic behavior of semi-crystalline polymers J. Mech. Phys. Solids 51 519-41.

Li Y, Qiu M X, Yang F, Wang S X and Yin Y 2008 Ultra-high sensitivity of super carbon-nanotube-based mass and strain sensors Nanotechnology 19 165502, Mar. 18, 2008.

Pal R 2005 New models for effective Young's modulus of particulate composites Composites B 36 513-23, Jun. 8, 2005.

Lou L and Nordlander P 1996 Carbon atomic chains in strong electric fields Phys. Rev. B 54 659-62, Dec. 1996.

Yan K Y, Xue Z Q, Zheng B Q and Hao Z L 2007 The interface effect of the effective electrical conductivity of carbon nanotube composites Nanotechnology 18 255705, Jun. 1, 2007.

C. L. Bliss, J. A. Szivek, B. C. Tellis, D. S. Margolis, A. B. Schnepp, and J. T. Ruth, Sensate Scaffolds Can Reliably Detect Joint Loading, J Biomed Mater Res B Appl Biomater., 2007, 81(1): 30-39, Apr. 2007.

M.A. Haque and M.T.A. Saif, A Review of MEMS-Based Microscale and Nanoscale Tensile and Bending Testing, J. Society for Experimental Mechanics, 2003, 43, 248-255, Sep. 2003.

Kin Tak Lau and David Hui, 2002, "The revolutionary creation of new advanced materials—carbon nanotube composites," Composites Part B: Engineering, 33, p. 263-277.

R.A. Brand, Joint Contact Stress: A Reasonable Surrogate for Biological Processes?, The Iowa Orthopaedic Journal, 25, 82-94, (2005).

Anand, S.V. and Mahapatra, D.R., "The dynamics of polymerized carbon nanotubes in semiconductor polymer electronics and electromechanical sensing," Nanotechnology, vol. 20, No. 14, pp. 1-7 (Mar. 2009).

Anand, S.V. And Mahapatra, D.R., "Quasi-static and dynamic strain sensing using carbon nanotube/epoxy nanocomposite thin films," Smart Materials and Structures, vol. 18, pp. 1-13 (Mar. 2009).

Hall, A.R., et al., "Electromechanical response of singlewalled carbon nanotubes to torsional strain in a self-contained device," Nature Nanotechnology. vol. 2, Issue 7, pp. 413-416 (Jul. 2007).

Hu, N., et al. "Tunneling effect in a polymer/carbon nanotube nanocomposite strain sensor," Acta Materialia, vol. 56, Issue 13, pp. 2929-2936 (Mar. 2008).

Yam C.Y., et al., "Dynamic admittance of carbon nanotube-based molecular electronic devices and their equivalent electric circuit," Nanotechnology, vol. 19, No. 49, pp. 495203 (Nov. 2008).

Yang, L and Han, J., "Electronic Structure of Deformed Carbon Nanotubes," Phys. Rev. vol. 85, Issue 1, 154-157 (2000).

* cited by examiner

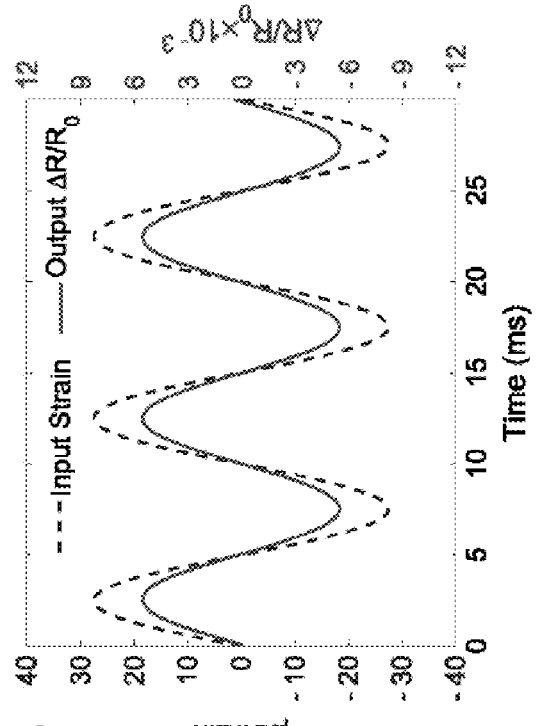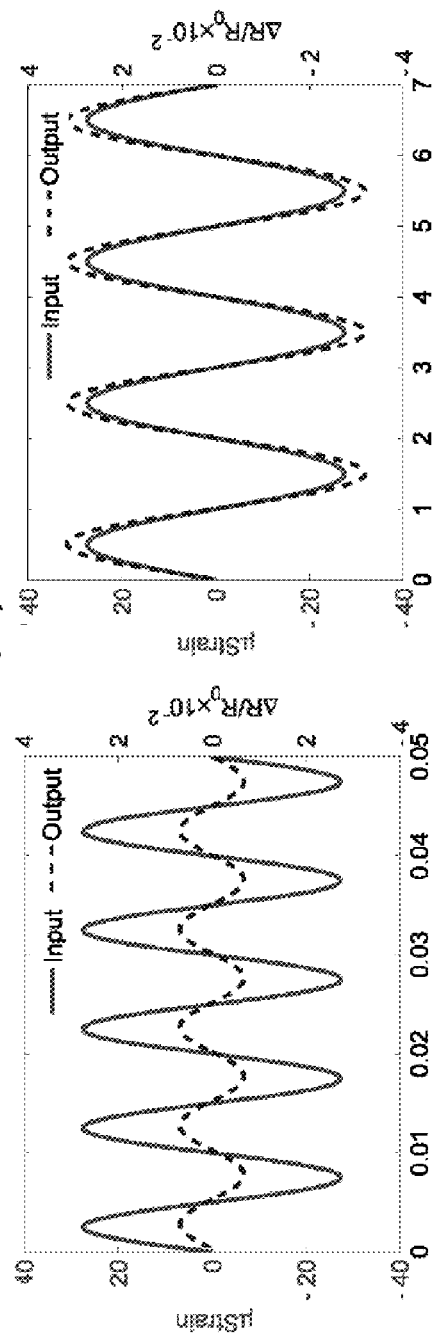
Figure 15
Figure 16
Figure 17

FLEXIBLE, STRETCHABLE, AND DISTRIBUTED STRAIN SENSORS

BACKGROUND

Strain may be defined as deformation experienced by a body resulting from an application of force. Existing ways of sensing strain include, for example, computational approaches, individual transducers, and pressure sensors, such as pressure-sensitive films and pressure-sensitive mats. Existing sensors include metallic-based or micro-electro-mechanical system (MEMs)-based strain-measuring devices. These sensors are generally fixed sizes and fixed shapes. Also, these typical sensors are rigid and flat, and hence, usually cannot be used for measuring strains on irregular and curved surfaces. Further, existing sensors are relatively expensive and neither flexible nor machinable. For example, MEMS type semiconductor and fiber-optic strain sensors can achieve high sensitivities, but have high manufacturing costs and require costly data acquisition systems.

Commercially available constantan or nickel-chromium-alloy-based strain gages offer wide static, dynamic, and temperature ranges. However, these gages also lack versatility and flexibility, as these gages can usually only measure strains at specific locations to which the gauges are bonded and along a directional grid. In addition, these gages typically exhibit a relatively low and narrow range of gauge factor, such as from 2.0 to 3.2.

The gauge factor of a strain sensor is defined as the relative change in the electrical resistance of the sensor for an applied mechanical strain. $R_0$ may be the resistance of the sensor under a no-strain condition, and the resistance may increase to $R_\varepsilon$ under the application of a strain $\varepsilon$. Ignoring any temperature effects, the gauge factor, G, of a strain sensor may be given by the relationship:

$$G = \frac{(R_\varepsilon - R_0)/R_0}{\varepsilon} = \frac{\Delta R/R_0}{\varepsilon}$$

Gauge factor serves as an index of sensitivity of a sensor to mechanical strain. A higher gauge factor indicates more strain sensitivity. For example, the larger the gauge factor is, the smaller the strains that may be detectable by a sensor.

SUMMARY

In one example aspect, a composite is described. The composite includes an electrically resistant material, conductive nanoparticles dispersed substantially throughout the electrically resistant material, and conductive nano-structures dispersed substantially throughout the electrically resistant material. A gauge factor of the composite is greater than about 4.

In another example aspect, a thin film sensor is described. The thin film sensor includes a thin film polymer matrix having two electrical terminals, conductive nanoparticles dispersed within the polymer matrix, and carbon nanotubes dispersed within the polymer matrix. The thin film polymer matrix has a resistivity across the two electrical terminals that varies with a magnitude of strain applied to the thin film polymer matrix.

In yet another example aspect, a method for sensing strain is described. The method includes applying a voltage to a flexible thin film strain sensor that is applied to a sensing area. The flexible thin film strain sensor comprises an electrically resistant material, conductive nanoparticles dispersed substantially throughout the electrically resistant material, and conductive nano-structures dispersed substantially throughout the electrically resistant material, and the flexible thin film sensor has a resistivity that varies with a magnitude of strain applied to the thin film sensor. A strain is present across the sensing area. The method further includes detecting an electrical response of the flexible thin film strain sensor in response to the strain present across the sensor area and determining a magnitude of the strain based at least on the electrical response.

In yet another example aspect, a system is described. The system includes a memristor that includes an electrically resistant material, conductive nanoparticles dispersed substantially throughout the electrically resistant material, and conductive nano-structures dispersed substantially throughout the electrically resistant material. The system also includes a voltage source to apply voltage to the memristor. A resistivity of the memristor changes with a time-varying voltage applied to the memristor, and the memristor retains changes to the resistivity of the memristor when the time-varying voltage is no longer applied.

In yet another example aspect, a composite is described. A composite includes a memristor and a substrate to which the memristor is bonded, the substrate being capable of inducing strain in the memristor. The memristor includes an electrically resistant material, conductive nanoparticles dispersed substantially throughout the electrically resistant material, and conductive nano-structures dispersed substantially throughout the electrically resistant material. A resistivity of the memristor changes with a time-varying strain applied to the memristor, and the memristor retains changes to the resistivity of the memristor when the time-varying strain is no longer applied.

In yet another example aspect, a method is described. The method includes setting an initial state of a memristor. The memristor comprises an electrically resistant material, conductive nanoparticles dispersed substantially throughout the electrically resistant material, and conductive nano-structures dispersed substantially throughout the electrically resistant material. The method also includes changing a state of the memristor from the initial state to a second state and detecting that the memristor is in the second state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 15 is an example graph of a simulation of a resistance of a carbon nanotube varying with strain and time.

FIG. 16 is an example graph of time-varying resistance of a carbon nanotube, carbon black, and epoxy composite varying with input dynamic strain at 100 Hz frequency.

FIG. 17 is an example graph of time-varying resistance of a carbon nanotube, carbon black, and epoxy composite varying with input dynamic strain at 500 Hz frequency.

DETAILED DESCRIPTION

Figure 1:
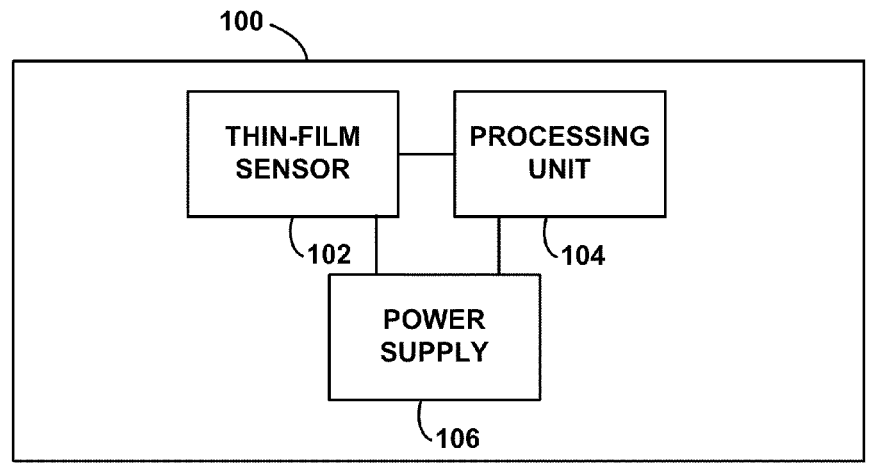
FIG. 1 illustrates a block diagram of an example sensor apparatus.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

One example described herein is a thin film sensor that includes a thin film polymer matrix that has two electrical terminals, conductive carbon black nanoparticles dispersed within the polymer matrix, and carbon nanotubes dispersed within the polymer matrix. The thin film polymer matrix has a resistivity across the two electrical terminals that varies with a magnitude of strain applied to the thin film sensor. Strain may be sensed by applying a voltage to the thin film sensor, and an electrical response of the thin film sensor may be detected due to a strain present across the sensor. A magnitude of the strain can be determined based on the electrical response. Other embodiments of sensors and composites and methods for strain sensing are possible and described.

Another example described herein is a memristor. The memristor includes a composite and a substrate to which the memristor is bonded that is capable of inducing strain in the memristor. The memristor includes an electrically resistant material, conductive nanoparticles dispersed substantially throughout the electrically resistant material, and conductive nano-structures dispersed substantially throughout the electrically resistant material, and the memristor has a resistivity that varies with a time-varying voltage input and with a time-varying strain input. The memristor may have multiple states corresponding to multiple resistivity values. An initial state of the memristor corresponding to an initial resistivity value may be set by applying voltage and strain to the memristor. The initial state may be changed to a second state corresponding to a second resistivity value by applying voltage and strain to the memristor. The second state of the memristor may be then detected.

A nano-structure material has structure on a molecular level. Fullerenes are examples of nano-structure. A fullerene is a molecule composed substantially (or in some examples entirely) of carbon atoms arranged in a particular shape, such as a hollow sphere, an ellipsoid, or a tube, for example. Carbon nanotubes (CNTs) are one example of cylindrical fullerenes.

Multiple features of CNTs make CNTs suitable for use in strain sensors. For example, CNTs may possess large surface areas, and an electrical conductivity of CNTs is a function of the chirality or composition of the nanotubes. A CNT also has a high Young's modulus under tensile force acting along a length of the CNT. (Young's modulus, E, is the stiffness of an isotropic elastic material.) CNTs may be subjected to forces without deforming and have sensitivity to changes in a surrounding environment. The tensile strengths of a wide variety of polymers may be enhanced by integrating of CNTs into the polymers, for example.

Another feature of CNTs may be an electronic energy band gap that increases with uniaxial and torsional strain. CNTs may typically undergo transition from a metallic state to a semiconducting state upon application of strain. Because electrons move more freely in a metallic state with zero energy band gap than in a semiconducting state with a higher electronic energy band gap, a metallic state may correspond to a lower resistivity than is present in a semiconducting state. Consequently, a resistance of CNTs typically increases when the CNTs are subjected to strain.

There are many types of CNTs. For example, one type includes single-walled carbon nanotubes (SWCNTs) that include hollow cylinders having walls that are a single-atom (of carbon) thick. Another type includes multiwalled carbon nanotubes (MWCNTs) that include either nested cylinders having walls that are a single-atom (of carbon) thick or rolls of a single-atom thick sheet (that would appear to be a spiral if observed end-on). MWCNTs may be more than about 10 μm long and have diameters in the range of 25-40 nm. Each MWCNT may have 25-40 layers with a total surface area in the range of 200-250 $m^2g^{-1}$. Bulk densities of MWCNTs may be on the order of 0.20 g $cm^{-3}$. Still another type includes highly pure grade carbon nanotubes are those having greater than about 99% carbon by weight and less than about 1% impurities, such as metals.

Referring now to the figures, FIG. 1 illustrates an example sensor apparatus 100. Sensor apparatus 100 may be used in any environment or application that requires strain sensing. Sensor apparatus 100 includes at least one thin-film sensor 102 connected to a processing unit 104 and a power supply 106. Processing unit 104 is also connected to power supply 106.

Processing unit 104 is configured to control operation of sensor 102 and to receive data from sensor 102. Processing unit 104 may operate according to an operating system, which may be any suitable commercially available embedded or disk-based operating system, or any proprietary operating system. Further, processing unit 104 may comprise one or more smaller central processing units, including, for example, a programmable digital signal processing engine or may also be implemented as a single application specific integrated circuit (ASIC) to improve speed and to economize space. In general, it should be understood that processing unit 104 could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

Power supply 106 is capable of supplying voltage to sensor 102. Processing unit 104 may set the voltage that power supply 106 supplies to sensor 102. Voltages supplied to sensor 102 may be DC, AC, or DC and AC.

Sensor 102 may sense strain or some related quality or characteristic and may take at least one measurement of strain or the related quality. Sensor 102 may include or be connected to a first electrical lead and a second electrical lead (not shown). A voltage may be applied across the two electrical leads so that a resistivity of the sensor may be measured. The resistivity of sensor 102 may vary predictably and measurably with a strain applied to sensor 102 so that if the resistivity of sensor 102 is known, a magnitude of the strain applied to sensor 102 may be determined.

Sensor 102 may have other electrical terminals, gates, or regions to which a bias voltage may be applied. Applying a bias voltage may facilitate tuning of sensor 102 to a desired sensitivity. Additionally, sensor 102 may have two operational modes; a first operational mode being resistive-type strain sensing and a second operational mode being semiconductor-type strain sensing, and the applied bias voltage may determine which of the two operational modes sensor 102 is operating in.

In one embodiment, sensor 102 may be a composite. The composite may include an electrically resistant material, conductive nanoparticles dispersed throughout the electrically resistant material, and conductive nano-structures dispersed throughout the electrically resistant material. Silver nanoparticle based conductive adhesive or other appropriate materials may be used to make electrical leads or terminals that may connect the composite to circuit elements such as a voltage source. A gauge factor of the composite, which is a ratio of relative change in electrical resistance due to strain, may be greater than about 4 and may also vary with temperature, for example.

The electrically resistant material of the composite may be an electrical insulator, or other material with relatively low conductivity (and relatively high resistivity). The electrically resistant material may be a polymer, such as epoxy resin. The electrically resistant material may also be a matrix in which the nanoparticles and the nano-structures are dispersed, suspended, or embedded, for example.

The conductive nanoparticles may constitute approximately 33% of a total volume of the composite. The conductive nanoparticles may be amorphous carbon, such as carbon black (CB). The conductive nanoparticles may also be platinum, silver, copper, and polyanylene. The conductive nanoparticles may also be a conductive polymer backbone and nanowires made of polyanylene and conjugate polymers, for example. A concentration of nanoparticles like CB provides a permanent conducting pathway in the composite (the existence of the conducting pathway not being dependent upon a strain experienced by the composite), which increases reliability and repeatability of measurements made using the composite. The addition of nanoparticles like carbon black may make the composite sufficiently conductive (by reducing electrical impedance) so that minimal electrical power is consumed. In an embodiment in which the thin-film sensor 102 includes carbon black and epoxy, the carbon black may lower the resistance of the epoxy from mega ohms to a range of a few kilo ohms, for example.

The conductive nano-structures may be carbon nanotubes (CNT), and in one example may constitute less than about 5% of the total weight of the composite. In another example, the conductive nano-structures may also constitute less than about 1% of the total weight of the composite. The CNTs used as the conductive nano-structures may be highly pure grade or may have metallic particles or carbon particle impurities. The CNTs may be more than about 10 micrometers long, and may have diameters in a range of less than about a nano-meter to hundreds of nanometers.

The thin-film sensor 102 may be prepared by processing carbon black nanoparticles and carbon nanotubes in epoxy resin by electromechanical and mechanochemical methods. As one example, the dispersion technique of ultrasonification may be used to disperse the CNTs and to increase the gauge factor of the composite. As another example, spin coating may be used to coat CNTs on the surface of the epoxy resin or the surface of an epoxy and carbon black composite. As yet an additional example, to align the CNTs, a deep-coating method with a slow draw out of a deep-coating solvent may be used. As yet another example, with typical dispersion techniques, CNTs may be randomly aligned with respect to each other. The thin-film sensor 102 may be made in any desired shape, pattern, or area. The thin-film sensor 102 may also be flexible and applied on irregular and stretchable surfaces using standard adhesives for bonding.

A residual strain or residual stress may arise in thin-film sensor 102 if, at the time of manufacturing, a base substrate of, or a mould for creating, thin-film sensor 102 is not stress free. For example, the base substrate may be bent or deformed when in a green viscous state or may be poured into a deformed mould. Therefore, after polymerization, residual strain arising out of the deformation of the substrate or the mould may remain present in thin film sensor 102. Temperature-induced shrinkage may also cause stress in thin film sensor 102 and may occur because of polymerization at an elevated temperature and subsequent cooling. The amount of residual strain in thin film sensor 102 may be determined by comparing electric and electro-mechanical properties with the electric and electro-mechanical properties of a strain-free sensor.

A change in the resistance of epoxy, carbon black, and carbon nanotube of the thin-film sensor 102 due to an applied uniaxial stress may be attributed to a change in a volume fraction of non-conducting epoxy of the thin-film sensor 102. Because an elastic moduli of the epoxy matrix differs from those of the carbon black and carbon nanotube fillers, the epoxy deforms more than the carbon black particles and carbon nanotubes under stress or strain. This difference in degree of deformation leads to a change in an effective energy band-gap in the thin-film sensor 102. As a result, resistance of the thin-film sensor 102 changes as a function of applied stress.

In example embodiments of thin film sensor 102 including epoxy, carbon black nanoparticles, and carbon nanotubes, operation and properties of thin film sensor 102 may be explained using the following parameters:

$L_0$ is an initial length of the thin-film sensor 102.

$A_0$ is an initial Area of cross section of the thin-film sensor 102.

$\epsilon_{xx}$ is an uniaxial tensile strain in the thin-film sensor 102.

$V_0$ is an initial volume of the thin-film sensor 102.

$V_m$ is an initial volume of epoxy in the thin-film sensor 102.

$V_{cb}$ is an initial volume of carbon black in the thin-film sensor 102.

$V_{cnt}$ is an initial volume of CNT in the thin-film sensor 102.

$V_m^{new}$ is a new volume of epoxy due to an application of $\epsilon_{xx}$.

$f_m$ is an initial volume fraction of epoxy in the thin-film sensor 102.

$f_m^{new}$ is a new volume fraction of epoxy due to an application of $\epsilon_{xx}$.

$\epsilon^{(m)}$ is a strain in an epoxy phase.

$\sigma$ is the stress.

$E_{eff}$ is the Young's modulus of carbon black/epoxy thin-film sensor 102.

$E_m$ is the Young's modulus of epoxy.

$E_{cb}$, is the Young's modulus of carbon black.

$\nu_m$ is the Poisson's ratio of epoxy.

$\nu_{cb}$ is the Poisson's ratio of carbon black.

$\phi$ is an applied bias voltage.

$\psi$ is an average orientation of carbon chains with respect to applied electric field.

$f_{cb}$ is a volume fraction of carbon black in the thin-film sensor 102.

$\kappa_m$ is an electrical conductivity of epoxy.

$\kappa_{cb}$ is an electrical conductivity of carbon black.

$\kappa_e$ is an effective electric conductivity of carbon black/epoxy thin-film sensor 102.

$E_0$ is an effective electric field.

$\kappa_{eff}$ is an effective electrical conductivity of CNT/carbon black/epoxy thin-film sensor 102

$\kappa_s$ is an electrical conductivity of an interfacial layer.

$\kappa_{cnt}$ is an electrical conductivity of a single CNT.

$\kappa_{com}^{(11)}$ is a transverse electrical conductivity of a complex CNT.

$\kappa_{com}^{(33)}$ is a longitudinal electrical conductivity of a complex CNT.

j is a spatially varying electrical current density.

$L_0$ and $A_0$ ($A_0 \ll L_0^2$) may be the initial length and initial cross-sectional area of the film on which the uniaxial stress is applied. A volumetric change in the epoxy matrix resulting from applied uniaxial stress in the thin-film sensor 102 is present, but any volumetric change specifically in the carbon black and carbon nanotube fillers is negligible. Because any volumetric change is experienced primarily in the epoxy matrix and not in the carbon black nanoparticles and the carbon nanotubes, the relative volumes of epoxy, carbon black, and carbon nanotubes changes when strain is applied to thin film sensor 102. For a uniaxial strain $\epsilon_{xx}$ applied to the thin-film sensor 102 with total initial volume $V_0$, initial volume of epoxy $V_m$, volume of carbon black filler $V_{cb}$ and volume of CNT $V_{cnt}$, a new volume V of the thin-film sensor 102 in terms of the new volume of epoxy, $V_m^{new}$, may be given by Equation 1:

$$V = V_m^{new} + V_{cb} + V_{cnt} = V_0(1+\epsilon_{xx}) \quad \text{Equation (1)}$$

$f_m$ is an initial volume fraction of epoxy in the thin-film sensor 102, and a new volume fraction $f_m^{new}$ may be given by Equation 2:

$$f_m^{new} = \frac{V_m^{new}}{V} = \frac{V_m^{new}}{V_0(1+\varepsilon_{xx})} \quad \text{Equation (2)}$$

$V_m^{new}$ may also be written in terms of strain developed in the epoxy as $V_m^{new} = V_m(1+\epsilon^{(m)})$, where $\epsilon^{(m)}$ is a strain developed in the epoxy and $V_m = f_m V_0$. This yields Equation 3:

$$f_m^{new} = f_m \left[\frac{1+\varepsilon^{(m)}}{1+\varepsilon_{xx}}\right] \quad \text{Equation (3)}$$

$\epsilon^{(m)}$ is greater than $\epsilon_{xx}$ as a stiffness of epoxy is less than that of the carbon black nanoparticle reinforced thin-film sensor 102. Hence, Equation 3 shows that a volume fraction of epoxy increases with the applied strain. As resistivity of epoxy is greater than that of the thin-film sensor 102, a resistance of the thin-film sensor 102 also increases with an increase in a volume fraction of epoxy. $\epsilon_{xx}$ is computed from an effective stiffness of the thin-film sensor 102 $E_{eff}$ whereas $\epsilon^{(m)}$ is non-linear and is computed from a phenomenological constitutive model of glassy polymers, for example.

The strain $\epsilon^{(m)}$ in the polymer (epoxy) can be first written in a rate form and the phenomenology of pre-yield softening is adopted. Mechanical properties of polymers are dependent not only on an applied strain, but also on a time rate of application of strain. Therefore, the mechanical response of a polymer on which strain is applied at one rate would be different than the mechanical response of a polymer on which strain is applied at a higher rate. Hence, the rate effect may be included in a strain calculation. A yield point is a point on a stress-strain curve when the material tend to become inelastic (i.e., elastic recovery is not possible beyond this point of stress-strain state). Softening means a decrease in a slope of the stress-strain curve. A pre-yield softening is observed in most polymers where a non-linear behavior is observed in the stress-strain relationship owing to fluctuation in the elastic properties of the polymers. Polymers generally soften prior to yield when strained sufficiently. Hence, pre-yield softening may be included in a strain calculation.

$E_{\textit{eff}}$ is the effective Young's modulus of a two component (CB/epoxy) used as a medium for CNT inclusion to create thin-film sensor 102. This depends on the Young's moduli of the components, $E_m$ for epoxy and $E_{cb}$ for carbon black, the volume fraction of each component, $f_m$ for epoxy and $f_{cb}$ for carbon black, respective Poisson's ratios ($v_m$ and $v_{cb}$), applied bias voltage $\phi$, average angle of orientation $\psi$ of the carbon chains with respect to the electric field, and the number of carbon atoms in the carbon chains. For a thin-film sensor 102 with volume fraction $f_{cb}$, a small number of new particles may be theoretically added. An increment in Young's modulus $dE_{\textit{eff}}$ resulting from an addition of the new particles may be calculated from a dilute system result by treating the thin-film sensor 102 to which the new particles are added as an equivalent effective medium of Young's modulus $E_{\textit{eff}}$ according to Equation 4:

$$dE_{\textit{eff}} = E_{\textit{eff}} K df_{cb} + E_{\textit{eff}} f_{cb} dK \qquad \text{Equation (4)}$$

which expands into Equation 5:

$$\frac{dE_{\textit{eff}}}{df_{cb}} = \left[\frac{E_{ef} f(f_{cb}^2 N_1 + f_{cb}(N_2 E_{\textit{eff}} + N_3))}{\left(\begin{array}{c}f_{cb}^2 M_1 + f_{cb}(M_2 E_{\textit{eff}} + M_3) + \\ (M_4 E_{\textit{eff}}^2 + M_5 E_{\textit{eff}} + M_6)\end{array}\right)}\right] +$$

$$\left[\frac{E_{\textit{eff}}(N_4 E_{\textit{eff}}^2 + N_5 E_{\textit{eff}} + N_6)}{\left(\begin{array}{c}f_{cb}^2 M_1 + f_{cb}(M_2 E_{\textit{eff}} + M_3) + \\ (M_4 E_{\textit{eff}}^2 + M_5 E_{\textit{eff}} + M_6)\end{array}\right)}\right] +$$

$$\left[\frac{E_{\textit{eff}} f_{cb}(2 f_{cb} N_1 + (N_2 E_{\textit{eff}} + N_3))}{\left(\begin{array}{c}(f_{cb}^2 M_1 + f_{cb}(M_2 E_{\textit{eff}} + M_3)) \\ \left(\begin{array}{c}f_{cb}^2 M_1 + f_{cb}(M_2 E_{\textit{eff}} + M_3) + \\ (M_4 E_{\textit{eff}}^2 + M_5 E_{\textit{eff}} + M_6)\end{array}\right)^2\end{array}\right)}\right] +$$

$$\left[\frac{E_{\textit{eff}} f_{cb}(2 f_{cb} N_1 + (N_2 E_{\textit{eff}} + N_3))}{\left(\begin{array}{c}(M_4 E_{\textit{eff}}^2 + M_5 E_{\textit{eff}} + M_6) \\ \left(\begin{array}{c}f_{cb}^2 M_1 + f_{cb}(M_2 E_{\textit{eff}} + M_3) + \\ (M_4 E_{\textit{eff}}^2 + M_5 E_{\textit{eff}} + M_6)\end{array}\right)^2\end{array}\right)}\right] +$$

$$\left[\frac{E_{\textit{eff}} f_{cb}(2 f_{cb} M_1 + (M_2 E_{\textit{eff}} + M_3))}{\left(\begin{array}{c}(f_{cb}^2 N_1 + f_{cb}(N_2 E_{\textit{eff}} + N_3)) \\ \left(\begin{array}{c}f_{cb}^2 M_1 + f_{cb}(M_2 E_{\textit{eff}} + M_3) + \\ (M_4 E_{\textit{eff}}^2 + M_5 E_{\textit{eff}} + M_6)\end{array}\right)^2\end{array}\right)}\right] +$$

$$\left[\frac{E_{\textit{eff}} f_{cb}(2 f_{cb} M_1 + (M_2 E_{\textit{eff}} + M_3))}{\left(\begin{array}{c}(N_4 E_{\textit{eff}}^2 + N_5 E_{\textit{eff}} + N_6) \\ \left(\begin{array}{c}f_{cb}^2 M_1 + f_{cb}(M_2 E_{\textit{eff}} + M_3) + \\ (M_4 E_{\textit{eff}}^2 + M_5 E_{\textit{eff}} + M_6)\end{array}\right)^2\end{array}\right)}\right]$$

Equation (5)

where $M_i$ and $N_i$ are constants and given by Equation 6:

$$M_1 = A_5 B_4, \; M_2 = 2\alpha_6 A_5 + \alpha_4 B_4$$

$$M_3 = A_4 B_4 + A_5 E_{c0} \; M_4 = 2\alpha_4 \alpha_6$$

$$M_5 = 2A\alpha_4 + \alpha_4 E_{c0} \; M_6 = A_4 E_{c0}$$

$$N_1 = C_1 A_2 B_4 + C_2 B_2 A_5$$

$$N_2 = 2\alpha_6 C_1 A_2 - C_1 \alpha_2 B_4 + C_2 B_2 \alpha_4 - C_2 A_5 \alpha_2 \alpha_5$$

$$N_3 = C_1 A_1 B_4 + C_1 A_2 E_{c0} + C_2 B_1 A_5 + C_2 B_2 A_4$$

$$N_4 = -(2 C_1 \alpha_2 \alpha_6 + C_2 \alpha_2 \alpha_4 \alpha_5)$$

$$N_5 = 2 C_1 A_1 \alpha_6 - C_1 \alpha_2 E_{c0} + C_2 B_1 \alpha_4 - C_2 A_4 \alpha_2 \alpha_5$$

$$N_6 = C_1 A_1 E_{c0} + C_2 B_1 A_4 \qquad \text{Equation (6)}$$

The effective Young's modulus of the composite $E_{\textit{eff}}$ may be computed according to Equation 4 by integrating Equation 4 numerically using a fourth order Runge-Kutta scheme.

The effective electrical conductivity $\kappa_e$ of the CB/epoxy background of thin-film sensor 102, which is a function of the volume fractions of the constituents, may be computed next using the effective medium approximation (EMA) considering both components as randomly dispersed isotropic spherical grains. The relative volume fraction of epoxy and carbon black may be $f_m$ and $f_{cb}$, respectively, where $f_{cb} = (1 - f_m)$, and the epoxy and carbon black may have conductivities $\kappa_m$ and $\kappa_{cb}$, respectively. According to the EMA, each component grain is considered to be immersed in a homogeneous effective medium of conductivity $\kappa_e$ instead of being embedded in its actual random background environment. Equation 7:

$$f_m \left[\frac{\kappa_m - \kappa_e}{\kappa_m + 2\kappa_e}\right] + (1 - f_m) \left[\frac{\kappa_{cb} - \kappa_e}{\kappa_{cb} + 2\kappa_e}\right] = 0 \qquad \text{Equation (7)}$$

gives an effective electrical conductivity of the unstrained CB/epoxy background of thin-film sensor 102. Substituting the strain-dependent volume fraction of epoxy $f_m^{\textit{new}} = f_m^{\textit{new}}(\sigma, \epsilon)$ in place of $f_m$ yields Equation 8:

$$f_m^{\textit{new}} \left[\frac{\kappa_m - \kappa_e}{\kappa_m + 2\kappa_e}\right] + \left(1 - f_m^{\textit{new}}\right) \left[\frac{\kappa_{cb} - \kappa_e}{\kappa_{cb} + 2\kappa_e}\right] = 0 \qquad \text{Equation (8)}$$

$$\Rightarrow \left[f_m \left(\frac{1 + \varepsilon^{(m)}}{1 + \varepsilon_{xx}}\right)\right]$$

$$\left[\frac{\kappa_m - \kappa_e}{\kappa_m + 2\kappa_e}\right] + \left[1 - f_m \left(\frac{1 + \varepsilon^{(m)}}{1 + \varepsilon_{xx}}\right)\right] \left[\frac{\kappa_{cb} - \kappa_e}{\kappa_{cb} + 2\kappa_e}\right] = 0,$$

where $\epsilon^{(m)}$ is computed as above.

The effective electrical conductivity $\kappa_{\textit{eff}}$ of the three component thin-film sensor 102 (CB/CNT/epoxy) may be computed considering the background $\kappa_e$ to which CNTs are added. $\kappa_e$ is a conductivity of the base matrix, and CNTs are considered to be randomly dispersed prolate ellipsoidal inclusions (all of the same shape) in this matrix, for example. For high aspect ratios, a cylinder can be suitably modeled by a prolate spheroid without introducing appreciable errors into a final solution. Since the effective fiber retains geometrical dimensions of the nanotube, the effective fiber's aspect ratio will also be high, and thus may be modeled with a prolate spheroidal inclusion. In modeling the cylindrical geometry with a spheroid, aspect ratios are substantially equivalent, meaning that a volume of the spheroidal inclusion will not be the same as that of the cylindrical inclusion. However, due to small dimensions of the multiwalled carbon nanotubes, this difference in volume may not significantly affect a volume fraction of the inclusion phase. The conductivity may be calculated using a generalized EMA model incorporating the interface shell effect.

A CNT may be coated with a thin interfacial layer of conductivity $\kappa_s$, and the CNT as a whole can be considered as a complex CNT. A quantum effect may also be regarded as a kind of interfacial effect, which affects the electrical conductivity of the composite accordingly. $\kappa_{cnt}$, $\kappa_e$, $\kappa_s$ and $\kappa_{eff}$ are the electrical conductivities of the CNT, matrix, interfacial layer and final composite.

The effective electrical conductivity $\kappa_{eff}$ of the complex CNTs and the (epoxy/CB) matrix may be calculated using a generalized EMA modeling the complex CNTs as prolate ellipsoids randomly mixed with spherical matrix particles. The effective electrical conductivity $\kappa_{eff}$ of the thin-film sensor 102 is defined as $\langle \vec{j} \rangle = \kappa_{eff} \vec{E}_0$, where $\langle \vec{j} \rangle$ is the volume average of the spatially varying current density. $\vec{E}_0$ is the volume average of $\vec{E}$, i.e. $\vec{E}_0 = \langle \vec{E} \rangle$. $B_{com,k}$ and $B_{m,k}$ are depolarization factors of the complex CNTs and matrix particles, $f_{cnt}$ is a volume fraction of CNTs in the composite, $\alpha$ is a ratio of a volume of the CNT and a volume of a complex CNT. The depolarization factors for spherical particles are taken as $B_{m,x}=B_{m,y}=B_{m,z}=\frac{1}{3}$, and that for the prolate ellipsoids, assuming $L/(2R) \gg 1$, $B_{com,x}=B_{com,y}=(1-B_{com,z})/2$. Given these values, and taking the final composite to be effectively isotropic, yields Equation 9:

$$\frac{f_{cnt}}{3\alpha}\left[\begin{array}{c}\frac{\kappa_{eff}-\kappa_{com}^{(33)}}{\kappa_{eff}+B_{com,z}(\kappa_{com}^{(33)}-\kappa_{eff})}+\\ 4\frac{\kappa_{eff}-\kappa_{com}^{(11)}}{2\kappa_{eff}+(1-B_{com,z})(\kappa_{com}^{(11)}-\kappa_{eff})}\end{array}\right]+$$

$$3\left(1-\frac{f_{cnt}}{\alpha}\right)\frac{\kappa_{eff}-\kappa_e}{2\kappa_{eff}+\kappa_e}=0$$

Equation (9)

Equation 9 can be solved for $\kappa_{eff}$ with a value for the background effective conductivity of the CB/epoxy matrix from Equation 8. $f_{cnt}$ may be written as a function of the applied strain according to Equation 10:

$$f_{cnt}^{new}=f_{cnt}\left[\frac{1}{1+\varepsilon_{xx}}\right]$$

Equation (10)

where $f_{cnt}^{new}$ is a new volume fraction of the CNTs in the composite due to the applied strain $\varepsilon_{xx}$, $\varepsilon^{(cnt)}$ is the strain developed in the CNTs, which can be obtained from the Young's Modulus of the CNT. Given that the strain-dependent volume fraction of CNT may be expressed by $f_{cnt}^{new}=f_{cnt}^{new}(\sigma_{xx},\varepsilon_{xx})$, Equation 11:

$$\left(\frac{f_{cnt}}{3\alpha}\right)\left(\frac{1+\varepsilon^{cnt}}{1+\varepsilon_{xx}}\right)\left[\begin{array}{c}\frac{\kappa_{eff}-\kappa_{com}^{(33)}}{\kappa_{eff}+B_{com,z}(\kappa_{com}^{(33)}-\kappa_{eff})}+\\ 4\frac{\kappa_{eff}-\kappa_{com}^{(11)}}{2\kappa_{eff}+(1-B_{com,z})(\kappa_{com}^{(11)}-\kappa_{eff})}\end{array}\right]+$$

$$3\left[1-\frac{f_{cnt}}{\alpha}\left(\frac{1+\varepsilon^{(cnt)}}{1+\varepsilon_{xx}}\right)\right]\frac{\kappa_{eff}-\kappa_e}{2\kappa_{eff}+\kappa_e}=0$$

Equation (11)

gives a relationship between the applied strain, $\varepsilon_{xx}$, and the effective conductivity, $\kappa_{eff}$, of the CB/CNT/epoxy composite. $\kappa_{eff}$ may be calculated using the value of $\kappa_e$ obtained from Equation 8.

For a dynamically induced strain $\varepsilon$ of frequency $\omega$, the change in resistivity of sensor 102, $\Delta R/R_0$, may oscillate at frequency $\omega$. The shape of a $\Delta R/R_0$ output curve over time may depend of the form of the dynamically induced strain. For instance, for a particular sinusoidal input strain, the $\Delta R/R_0$ output curve may be a sinusoid in phase with the input strain.

A viscoelastic part of the strain, $\varepsilon_{ve}$, in one dimension, with frequency dependence may be expressed by Equation 12:

$$\varepsilon_{ve}=\frac{\sqrt{2}}{\omega}\overline{\gamma}_0\exp[-f(Z,n,\varepsilon_{ve})]$$

Equation (12)

in which $f$ is a nonlinear function, $Z$ is an internal state variable, n is a strain rate sensitivity parameter, $\gamma_0$ is a limiting shear strain rate. $f$ may be an exponential function, a quadratic function, a cubic function, or any other appropriate non-linear function. $f$ may depend on a polymer type, an arrangement of polymer chains, strain rates, temperature, or other parameters. The $1/\omega$ term may capture viscoelastic effects, and the nonlinear function $f$ captures the strain rate-induced softening/hardening effect.

Total strain may be expressed by Equation 13:

$$\varepsilon=\varepsilon_{el}+\varepsilon_{ve}=$$

$$\frac{\sigma_0-\rho_{eff}\omega^2 u}{E_{eff}^{(0)}+f_{cb}\overline{\gamma}V^2\cos^2\psi}+\frac{\sqrt{2}}{\omega}\overline{\gamma}_0\exp[-f(Z,n,\varepsilon_{ve})]$$

Equation (13)

As the frequency increases, both $\omega^2$ and $1/\omega$ influence the change in effective resistance $\Delta R/R_0 \approx A+B\varepsilon$. For a constant dynamic stress amplitude $|\sigma_0|$, as the frequency increases, both the first term in Equation 13, with $-\omega^2$, and the second term in Equation 13, with $1/\omega$, operate to decrease $\Delta R/R_0$. But the nonlinear viscoelastic strain ($\varepsilon_{ve}$) is inversely proportional to the frequency, and therefore the term $\exp[-f(Z,n,\sigma_0,\varepsilon_{ve})]$ will increase and so will $\Delta R/R_0$. As a result, in the low to medium frequency ranges, which are dominated by $\varepsilon_{ve}$, there is an overall increase in $\Delta R/R_0$, whereas at higher frequencies this effect weakens due to the lesser influence of $\varepsilon_{ve}$ and the greater influence of $-\omega^2$ and $1/\omega$ terms. On the other hand, for an increase in the bias voltage V, $\Delta R/R_0$ decreases.

The foregoing is one description of properties and operation of a carbon black, carbon nanotube, and epoxy embodiment of thin-film sensor 102; however other descriptions of the properties and operation of such a composite, and other strain sensing composites, are possible.

Returning to FIG. 1, after thin-film sensor 102 provides measurements to processing unit 104, processing unit 104 may use the measurements to determine a magnitude of strain applied to sensor 102. For instance, processing unit 104 may use the measurements to solve the foregoing equations to determine the applied strain. Conductivity, $\kappa$, and resistance, R, are related as in Equation 14:

$$R=\frac{L}{\kappa A}$$

Equation (14)

Equation 11 expresses the relationship between the applied strain ($\varepsilon_{xx}$) and the conductivity of the sensor ($\kappa_{eff}$). Processing unit 104 may take a measured resistance and may use that measured resistance to determine conductivity, $\kappa_{eff}$, using Equation 14. Processing unit 104 may then solve Equation 11, using the determined conductivity as an input, to determine the applied strain, $\varepsilon_{xx}$. In Equation 11, all terms except $\kappa_{eff}$, $\varepsilon_{xx}$ and $\kappa_e$ may be constants, and $\kappa_e$ may be obtained from Equation 8. Alternately, processing unit 104 may have access to look-up tables that map values or ranges of values measured by sensor 102 onto values or ranges of values of applied strain. Such a look-up table may be generated when sensor 102 is designed, constructed, or calibrated. Processing unit 104 may use the determined value or values of the applied strain in other calculations or may communicate the determined magnitude of the applied strain to another system or output device (not shown).

Figure 2:
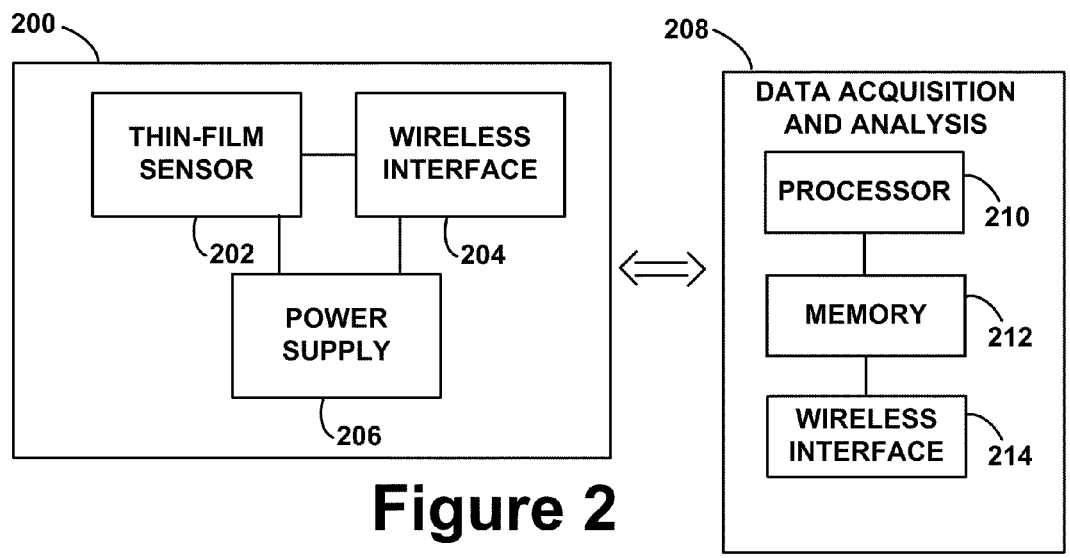
FIG. 2 illustrates a block diagram of another example sensor apparatus with an example data acquisition and analysis unit.

FIG. 2 illustrates another example sensor apparatus 200, which may be used in any environment or application which requires strain sensing. Example sensor apparatus 200 includes a thin-film sensor 202 in communication with a wireless interface 204 and a power supply 206. Wireless interface 204 is also in communication with power supply 206. Example sensor apparatus 200 may be in communication with, connected to, and otherwise associated with a data acquisition and analysis unit 208. Data acquisition and analysis unit 208 includes a processor 210 in communication with a memory 212 and a wireless interface 214.

Wireless communication interfaces 204 and 214 may be any wireless communication interfaces currently known in the art or later developed. Wireless communication interface 204 may communicate with wireless communication interface 214 such that wireless communication interface 204 sends data or instructions from example sensor apparatus 200 to data acquisition and analysis unit 208 through wireless communication interface 214 and receives data or instructions from data acquisition and analysis unit 208 through wireless communication interface 214. Wireless communication interface 214 may communicate with wireless communication interface 204 such that wireless communication interface 214 sends data or instructions from data acquisition and analysis unit 208 to example sensor apparatus 200 through wireless communication interface 204 and receives data or instructions from example sensor apparatus 200 through wireless communication interface 204.

Power supply 206 is capable of supplying voltage to sensor 202. Power supply 206 may receive instructions on operation or may be set by wireless interface 204. Voltages supplied to sensor 202 may be DC, AC, or DC and AC.

Sensor 202 may sense strain or some related quality and may take at least one measurement of strain or the related quality. Like sensor 102, sensor 202 may include electrical leads and terminals across which different voltages may be applied (not shown). Resistivity of sensor 202 may vary predictably and measurably with a strain applied to sensor 202 so that if the resistivity of sensor 202 is known, a magnitude of the strain applied to sensor 202 may be ascertainable. Sensor 202 may have analogous compositions and properties, and may be fabricated or manufactured in the same way as sensor 102, for example. Sensor 202 may communicate measured strain or related quantities, and related information, to wireless interface 204, which may, in turn, communicate the measured strain or other values to data acquisition and analysis unit 208.

Data acquisition and analysis unit 208 may analyze the received measurements to identify and analyze strain sensed by sensor 202. Processer 210 of data acquisition and analysis unit 208 may process data received from the sensor apparatus 200. For instance, processor 210 may use the measurements to solve the foregoing equations to determine the applied strain. For instance, processor 210 may take a measured resistance and may use that measured resistance to determine conductivity, $\kappa_{eff}$, using Equation 14. Processor 210 may then solve Equation 11, using the determined conductivity as an input, to determine the applied strain, $\epsilon_{xx}$. In Equation 11, all terms except $\kappa_{eff}$, $\epsilon_{xx}$ and $\kappa_e$ may be constants, and $K_e$ may be obtained from Equation 8. Many of the parameters of sensor 202 may be known, set, or unvarying, so that the calculations of processor 210 may be relatively simple. Alternately, processor 210 may have access to look-up tables that map values or ranges of values measured by sensor 202 onto values or ranges of values of applied strain. Such a look-up table may be generated when sensor 202 is designed, constructed, or calibrated. Processor 210 may use the determined value or values of the applied strain in other calculations or may communicate the determined magnitude of the applied strain to another system or output device (not shown).

Processer 210 may be embodied as a processor that accesses memory 212 to execute software functions stored therein. One skilled in the art of computer systems design will understand that the example embodiments are not limited to any particular class or model of processor. Processer 210 may operate according to an operating system, which may be any suitable commercially available embedded or disk-based operating system, or any proprietary operating system. Further, processer 210 may comprise one or more smaller central processing units, including, for example, a programmable digital signal processing engine or may also be implemented as a single application specific integrated circuit (ASIC) to improve speed and to economize space. In general, it should be understood that processor 210 could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

Memory 212 may store information such as previously transmitted or received data from the sensor apparatus 200, for example. Memory 212 may store equations or data describing or modeling the behavior of sensor 202. Memory 212 may also store look-up tables mapping measured resistivity values to values of applied strain. Memory 212 may include random access memory (RAM), flash memory or long term storage, such as read only memory (ROM) or magnetic disks, for example.

Figure 3:
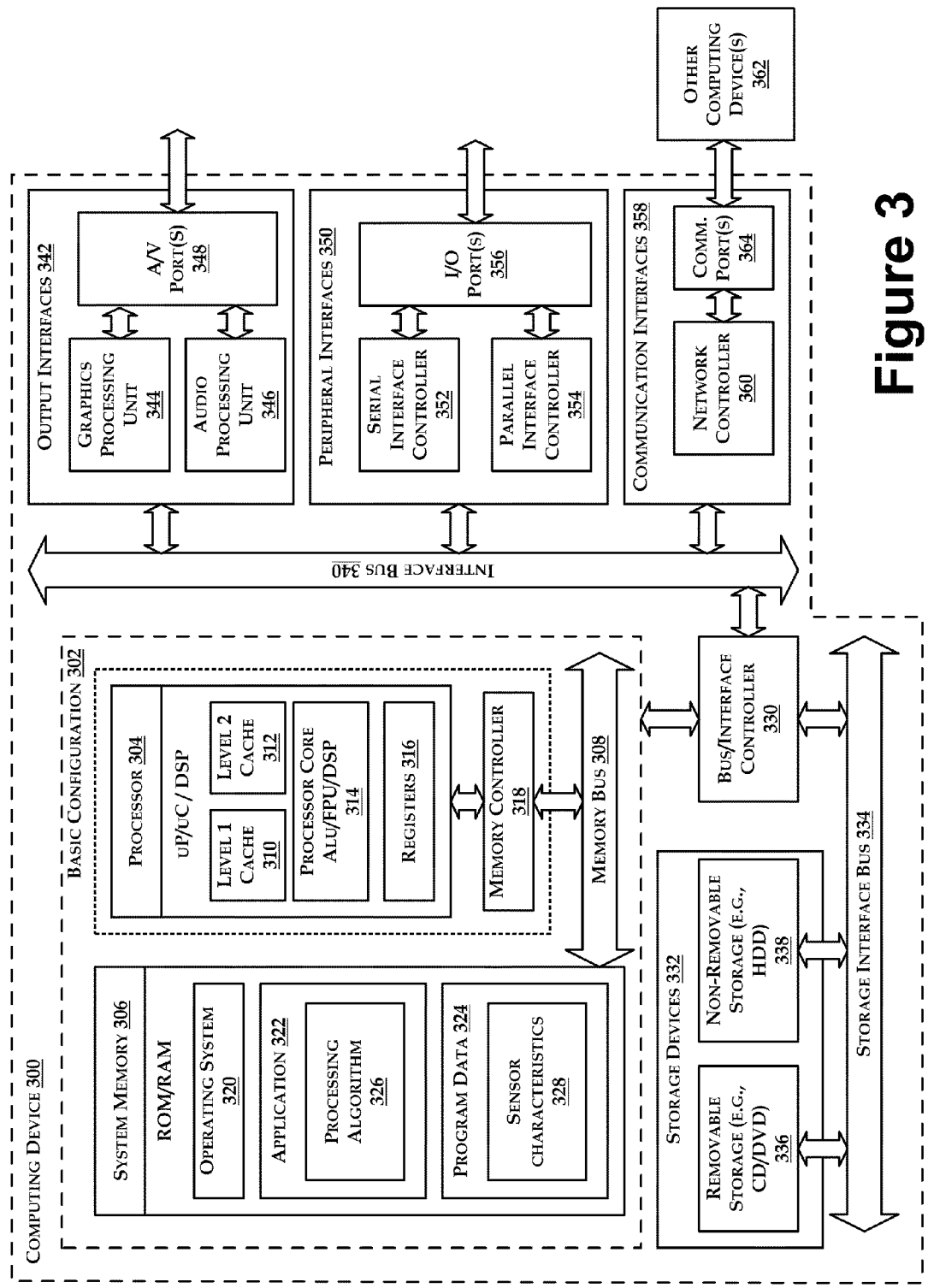
FIG. 3 is a block diagram illustrating an example computing device, which may be a component of, a description of, or a system connected to, example sensor apparatuses and example processing and analysis units, or which maybe a component of or a system connected to an example memristor system.

FIG. 3 is a block diagram illustrating an example computing device 300, which may be a component of, a description of, or a system connected to, example sensor apparatus 100, example sensor apparatus 200, or data acquisition and analysis unit 208. In a very basic configuration 302, computing device 300 typically includes one or more processors 304 and system memory 306. A memory bus 308 can be used for communicating between the processor 304 and the system memory 306.

Depending on the desired configuration, processor 304 can be of any type including but not limited to a microprocessor (μP), a microcontroller (μC), a digital signal processor (DSP), or any combination thereof. Processor 304 can include one more levels of caching, such as a level one cache 310 and a level two cache 312, a processor core 314, and registers 316. The processor core 314 can include an arithmetic logic unit (ALU), a floating point unit (FPU), a digital signal processing core (DSP Core), or any combination thereof. A memory controller 318 can also be used with the processor 304, or in some implementations the memory controller 318 can be an internal part of the processor 304.

Depending on the desired configuration, the system memory 306 can be of any type including but not limited to volatile memory (such as RAM), non-volatile memory (such as ROM, flash memory, etc.) or any combination thereof. System memory 306 typically includes an operating system 320, one or more applications 322, and program data 324. Application 322 includes algorithms 326 that may be arranged to perform any function described herein depending on a configuration of the computing device 300. Program data 324 may include sensor characteristics 328, which may be, for example, stored resistivity measurements, stored strain determinations, or look-up tables mapping resistivity values to strain values for thin film sensor 102. In some example embodiments, application 322 can be arranged to operate with program data 324 on an operating system 320. This described basic configuration is illustrated in FIG. 3 by those components within dashed line 302.

Computing device 300 can have additional features or functionality, and additional interfaces to facilitate communications between the basic configuration 302 and any required devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 306, removable storage 336, and non-removable storage 338 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media can be part of device 300.

Computing device 300 can also include an interface bus 340 for facilitating communication from various interface devices (e.g., output interfaces, peripheral interfaces, and communication interfaces) to the basic configuration 302 via the bus/interface controller 330. Example output interfaces 342 include a graphics processing unit 344 and an audio processing unit 346, which can be configured to communicate to various external devices such as a display or speakers via one or more A/V ports 348. Example peripheral interfaces 350 include a serial interface controller 352 or a parallel interface controller 354, which can be configured to communicate with external devices such as input devices (e.g., keyboard, mouse, pen, voice input device, touch input device, etc.) or other peripheral devices (e.g., printer, scanner, etc.) via one or more I/O ports 356. An example communication interface 358 includes a network controller 360, which can be arranged to facilitate communications with one or more other computing devices 362 over a network communication via one or more communication ports 364.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

Figure 4:
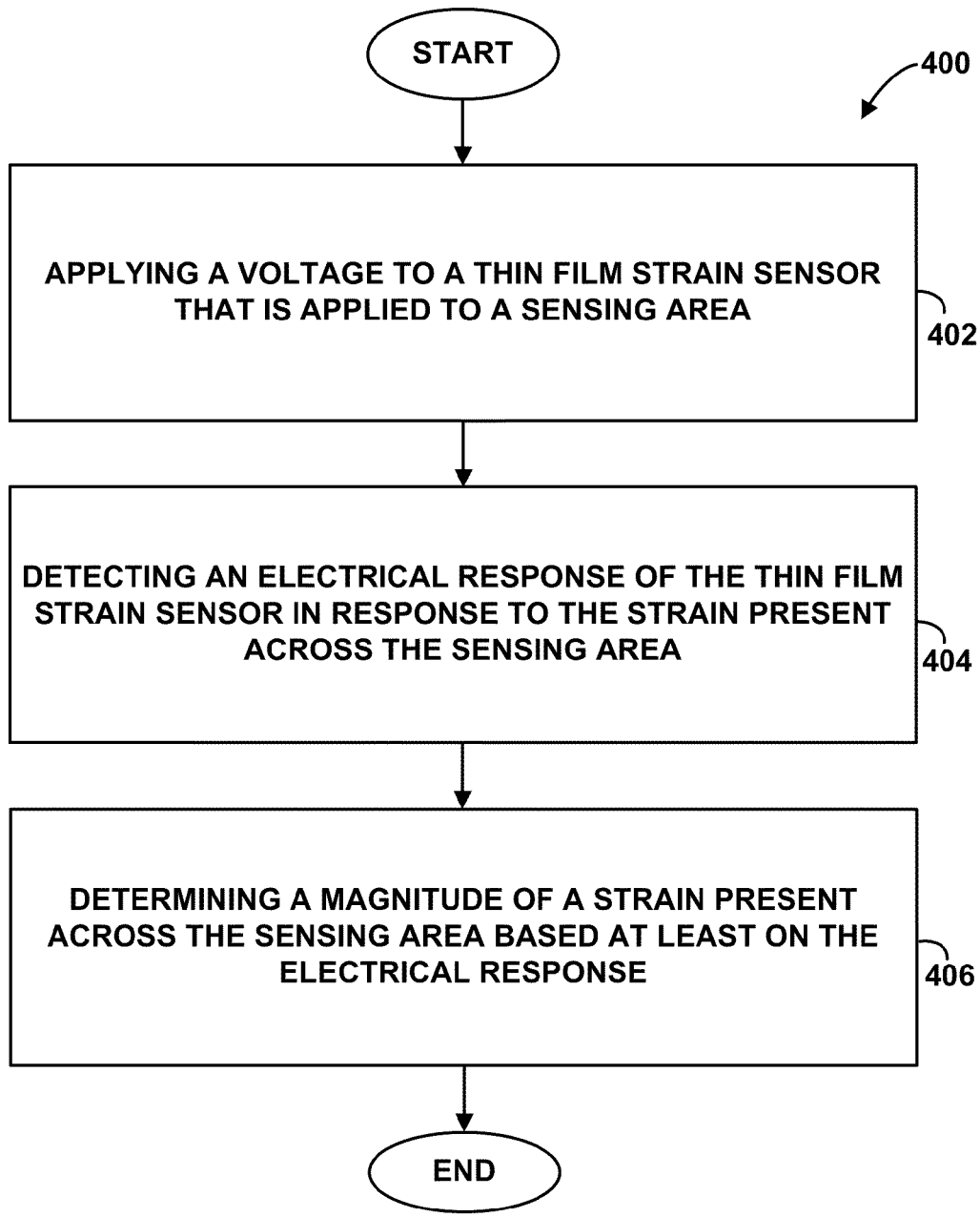
FIG. 4 is a flowchart that depicts example steps of a method for sensing strain.

FIG. 4 is a flowchart that depicts example steps of a method 400 for sensing strain. FIG. 4 shows functionality and operation of one possible implementation of present embodiments and should not be taken to limit the number, order, separation, combination, addition, or deletion of steps in other method embodiments. Method 400 is described herein with reference to FIG. 1, but may be used in other contexts. Example sensing apparatus 100 may be applied to a sensing area (not shown), such that thin film sensor 102 experiences strain that is present across the sensing area. Method 400 begins at block 402, where a voltage is applied to a flexible thin film sensor that is applied to a sensing area. In example sensor apparatus 100, power supply 106 may apply a voltage to sensor 102. The voltage applied to sensor 102 may create an electrical response that is indicative of a magnitude of the strain that is present across the sensing area.

At block 404, the electrical response of the thin film strain sensor in response to the strain present across the sensing area is detected. In example sensor apparatus 100, processing unit 104 may detect the electrical response, such as by measuring the resistivity or resistance of sensor 102.

Next, at block 406, a magnitude of a strain present across the sensing area may be determined based on, or using, at least the detected electrical response. For example, processing unit 104 may solve the equations relating resistivity to strain as described above. The magnitude of the voltage applied in block 402 may also be used as an input to the equations that processing unit 104 solves. In example sensor apparatus 100, processing unit 104 may determine the applied strain. For instance, processing unit 104 may use resistance, resistivity, or conductivity measurements to solve the appropriate equations to determine the applied strain. Many of the parameters of sensor 102 may be known, set, or unvarying, so that the calculations of processing unit 104 may be relatively simple. Alternately, processing unit 104 may determine the applied strain by using look-up tables that map values or ranges of values measured by sensor 102 onto values or ranges of values of applied strain. Such a look-up table may be generated when sensor 102 is designed, constructed, or calibrated.

Other method embodiments may include other steps. For instance, a bias voltage may be applied across the flexible thin film strain sensor, in which case determination of the applied strain in step 406 would take into account the applied bias voltage. Also, a temperature of the flexible thin film strain sensor may be measured, and determination of the applied strain in step 406 may take into account the applied bias voltage. As another example, a residual strain or stress bearing on the flexible thin film strain sensor may be ascertained, in which case the determination of the applied strain in step 406 would take into account the residual strain or stress. Residual strain may be present because of deformations of a substrate or a mould during a manufacturing process, and residual strain may be ascertained by comparing sensor 102 to a strain-free sensor. As yet another example, an externally controlled mechanically applied strain may be applied to the flexible thin film strain sensor 102, in which case the determination of the applied strain in step 406 would take into account the mechanically applied strain.

Figure 5:
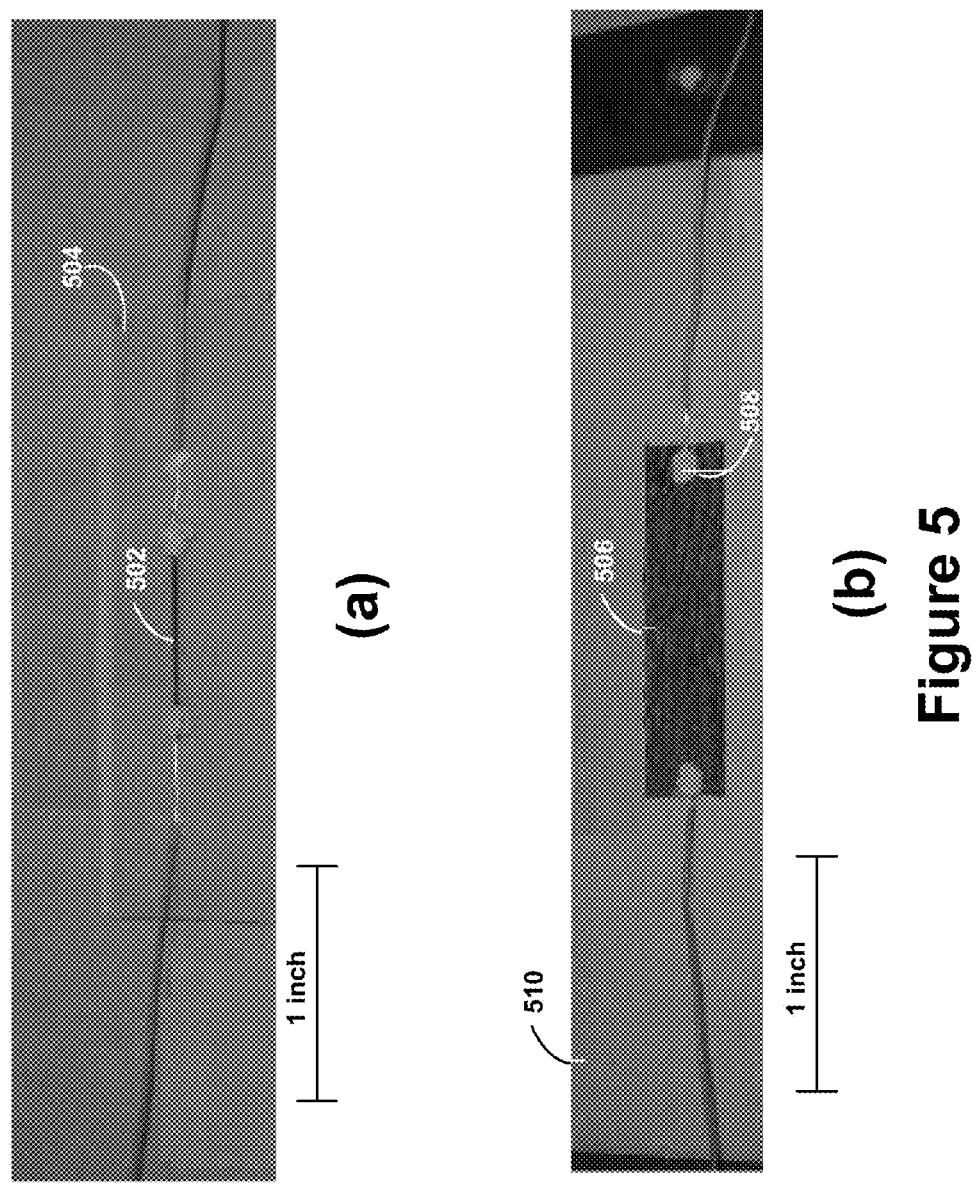
FIG. 5 depicts example thin film sensors consisting of a fabricated composite of multiwalled carbon nanotubes, epoxy, and carbon black, in film and wire forms, on glass and polycarbonate substrates.

FIG. 5 depicts example thin film sensors including a fabricated composite of multiwalled carbon nanotubes, epoxy, and carbon black, in film and wire forms, on glass and polycarbonate substrates. In FIG. 5(a), a wire 502 made of a composite of multiwalled carbon nanotube, epoxy, and carbon black is mounted on a glass substrate 504. In FIG. 5(b), a multiwalled carbon nanotube, epoxy, and carbon black thin film 506 is mounted on a polycarbonate substrate 510. Polycarbonate substrate 510 may have a modulus of elasticity in the range of about 2-3 GPa. Conductive terminals such as a conducting terminal 508 on thin film 506 may be made from silver conducting glue or a similar substance.

The material of wire 502 may be filled into a thin mould on glass substrate 504, and the material may then be polymerized or cured. FIG. 5 shows wire 502 after the wire 502 was polymerized, for example. The material of film 506 can be filled into a shallow mould on polycarbonate substrate 510, and the material may be polymerized or cured, for example. FIG. 5 shows film 506 after the film 506 was polymerized, for example.

Figure 6:
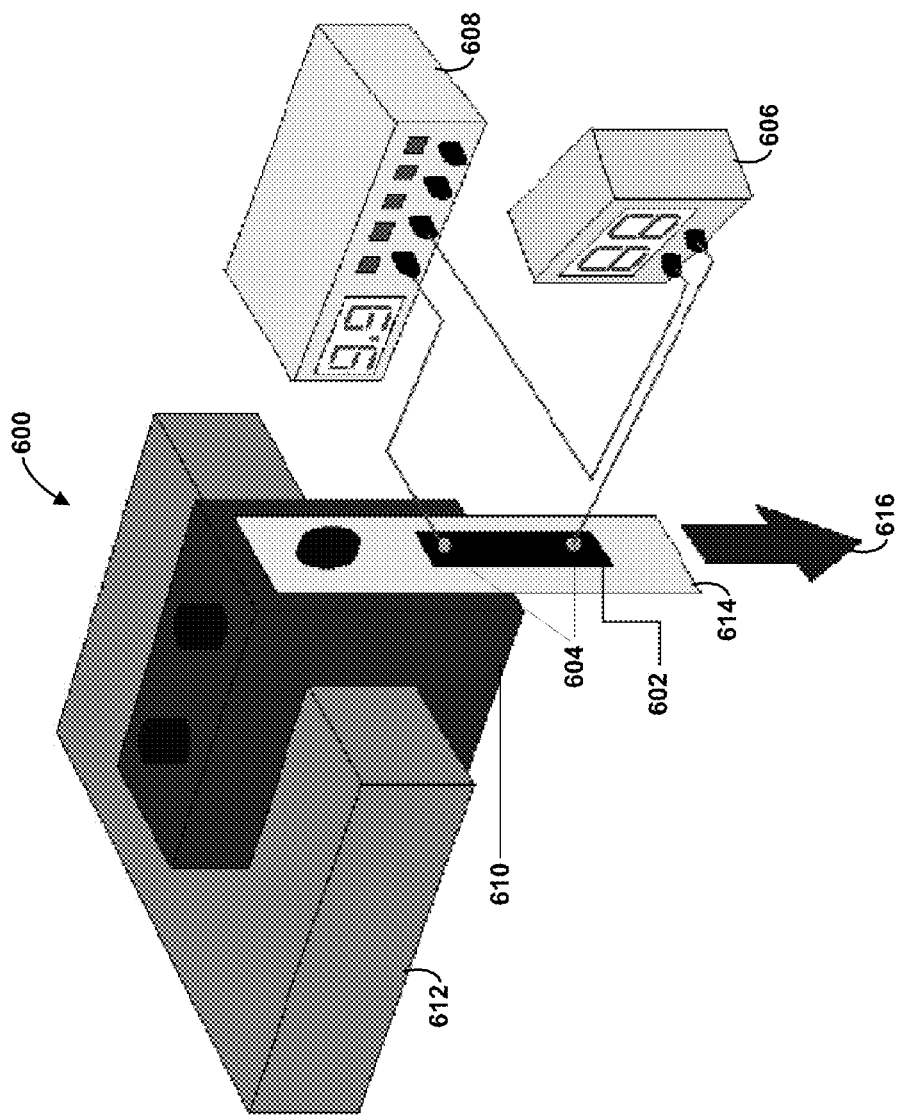
FIG. 6 illustrates an example use of thin film sensor subject to static loading in a circuit that allows measurement of current across the thin film sensor.

FIG. 6 is a block diagram that illustrates an example system 600 that may subject a thin film sensor to static loading, and includes a circuit that allows for measurement of current across the thin film sensor. A composite film 602, comprising an epoxy, carbon black, and carbon nanotube mixture, is connected via electrically conductive terminals 604 to a DC ammeter 606 and a DC voltage supply 608, to create a circuit. Composite film 602 may correspond to film 506 in FIG. 5, and conductive terminals 604 may correspond to conducting terminals 508. A clamping fixture 610 is mounted on a stable structure 612, and clamping fixture 610 anchors a substrate 614 to which composite film 602 is affixed. A tensile force 616 is applied to substrate 614, and by virtue of being affixed to substrate 614, composite film 602 experiences tensile force 616.

DC current voltage characterization may be measured to understand the electronic properties of the sensing film 602. The films prepared on the glass substrate may be connected to a DC power supply and an ammeter is connected in series, such as is shown in FIG. 6. The voltage may be varied continuously, and a corresponding current in the circuit may be measured. A temperature of the film 602 may be maintained to avoid temperature induced changes in the film 602, which may create an isothermal process. Strain may be applied on the film 602 by mechanically loading the film 602 as shown in FIG. 6.

Load may be applied in the length direction of the film 602 at a constant strain rate of about $0.5 \times 10^{-4}$/s to create a quasi-static loading process. About 20 loading-unloading cycles may be carried out at the strain rate to allow stabilization of the film 602.

The film 602 may operate similar to a semiconductor under no applied mechanical load. With increasing voltage, current remains negligible until a certain bias voltage is reached, after which the current begins to increase steadily. Breakdown then occurs at a particular voltage, after which point the current increases rapidly.

Figure 7:
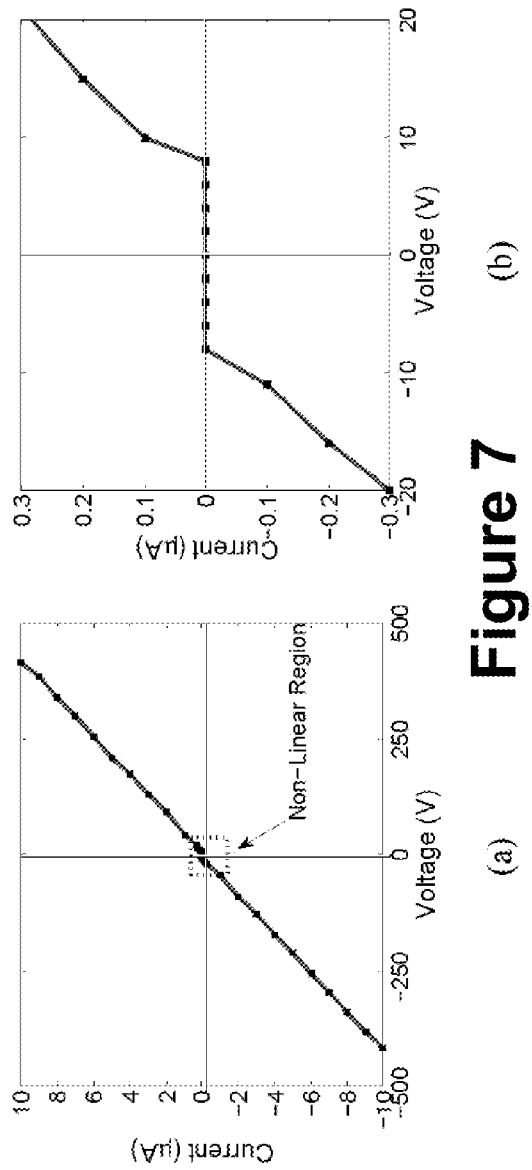
FIG. 7 is an example graph of the experimentally-determined DC current voltage characteristics of carbon black and epoxy composites, having 33% by volume carbon black, under no mechanical load.

FIG. 7 is an example graph of experimentally-determined DC current voltage characteristics of carbon black and epoxy composites that have about 33% by volume carbon black under no mechanical load. For a wide range of voltages, from zero to about 500V, and across both polarities of voltage, the current response was approximately linear (and thus Ohmic) as shown in FIG. 7(a). However, at low magnitude voltages, from zero to a threshold voltage of about 9V, the carbon black and epoxy composite had little or no current response, as shown in FIG. 7(b). The carbon black and epoxy composite behaved similarly to a semiconductor diode, for example.

Figure 8:
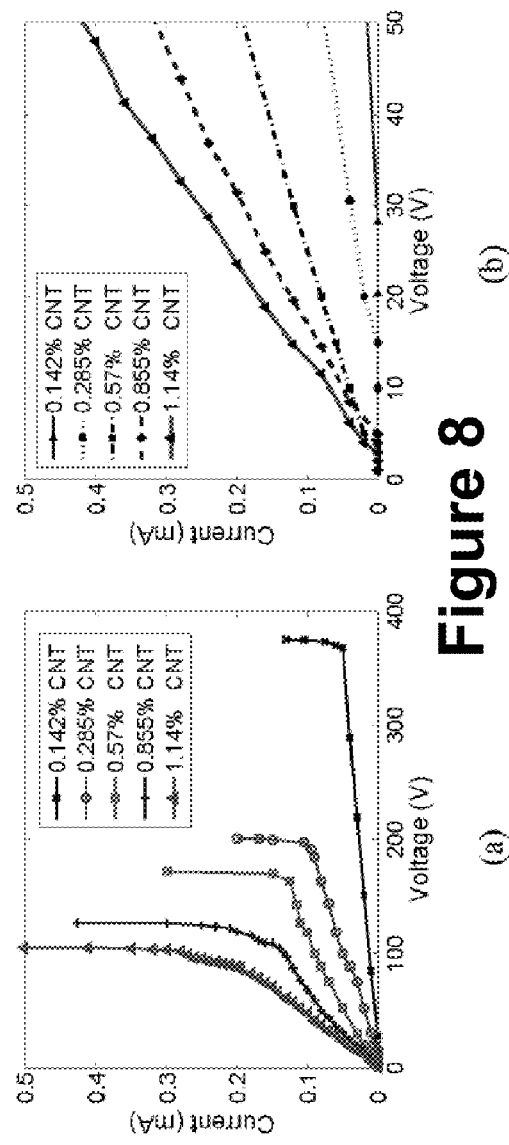
FIG. 8 is an example graph of experimentally-determined DC current voltage characteristics of epoxy, carbon black, and carbon nanotube composites, having 33% by volume carbon black, and having various weight fractions of carbon nanotubes under no mechanical load.

FIG. 8 is an example graph of experimentally-determined DC current voltage characteristics of epoxy, carbon black, and carbon nanotube composites that have about 33% by volume carbon black, and have various weight fractions of carbon nanotubes under no mechanical load. Five different weight fractions of carbon nanotubes were used with the following approximate weight fractions: 0.142%, 0.285%, 0.57%, 0.855%, and 1.14%. As shown in FIG. 8(a), a voltage at which the current began to increase rapidly decreased with an increase in carbon nanotube concentration. For example, at 0.142% CNT, the breakdown voltage was about 380V, and at 0.855% CNT, the breakdown voltage was only about 100V.

In addition, resistivity dropped with an increase in CNT concentration. This may be attributed to the creation of more conducting paths in the thin film due to the addition of CNTs. Similar to the CB/epoxy composites described in FIG. 7, the CNT/CB/epoxy films also showed a nonlinear behavior initially under no mechanical loading, as shown in FIG. 8(b). Current in all the films was negligible up to a certain voltage (e.g., the threshold voltage), after which point the current began to rise. The threshold voltage also decreased with the increase in the CNT concentration. For example, at 0.142% CNT, the threshold voltage was about 28V, and at 1.14% CNT, the threshold voltage was only about 3V. With the addition of 1% CNT by weight, the resistance of the composite film was reduced by an order of magnitude and the threshold voltage was reduced by over 90%, for example.

Figure 9:
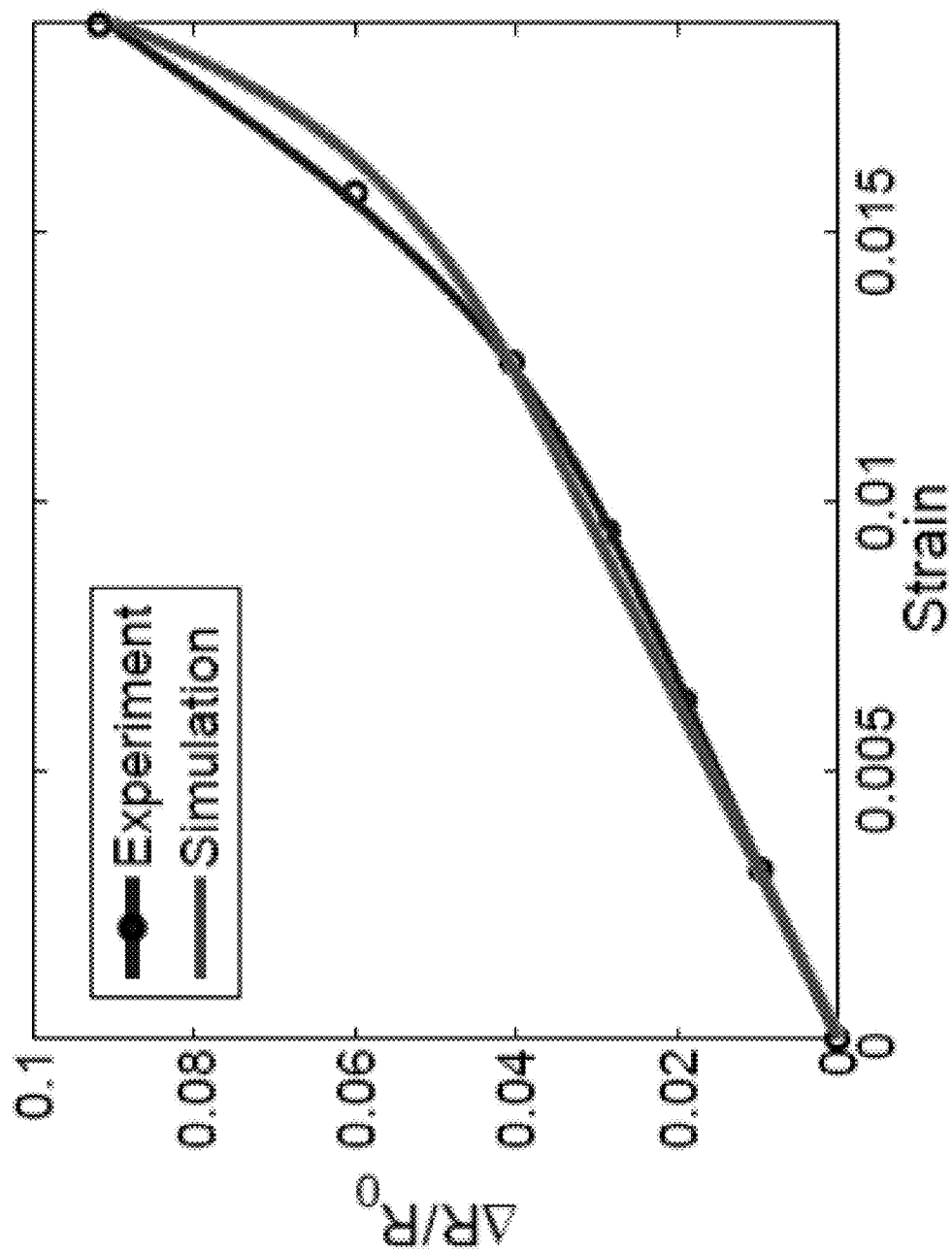
FIG. 9 is an example graph of a comparison between measured and simulated resistance change as a function of strain for a carbon black/epoxy composite having 33% by volume carbon black and no bias voltage.

FIG. 9 is an example graph of a comparison between measured and simulated resistance change as a function of strain for a carbon black/epoxy composite that has about 33% by volume carbon black and no bias voltage. The composite showed a linear change in resistance up to a strain of about 1.2% and a nonlinear change for larger strains likely due to pre-yield softening of epoxy. The composite was sensitive to small strains and showed a resistance change of close to about 9% for a strain as small as about 2%, for example. The gauge factor was approximately 4.5, for example.

Figure 10:
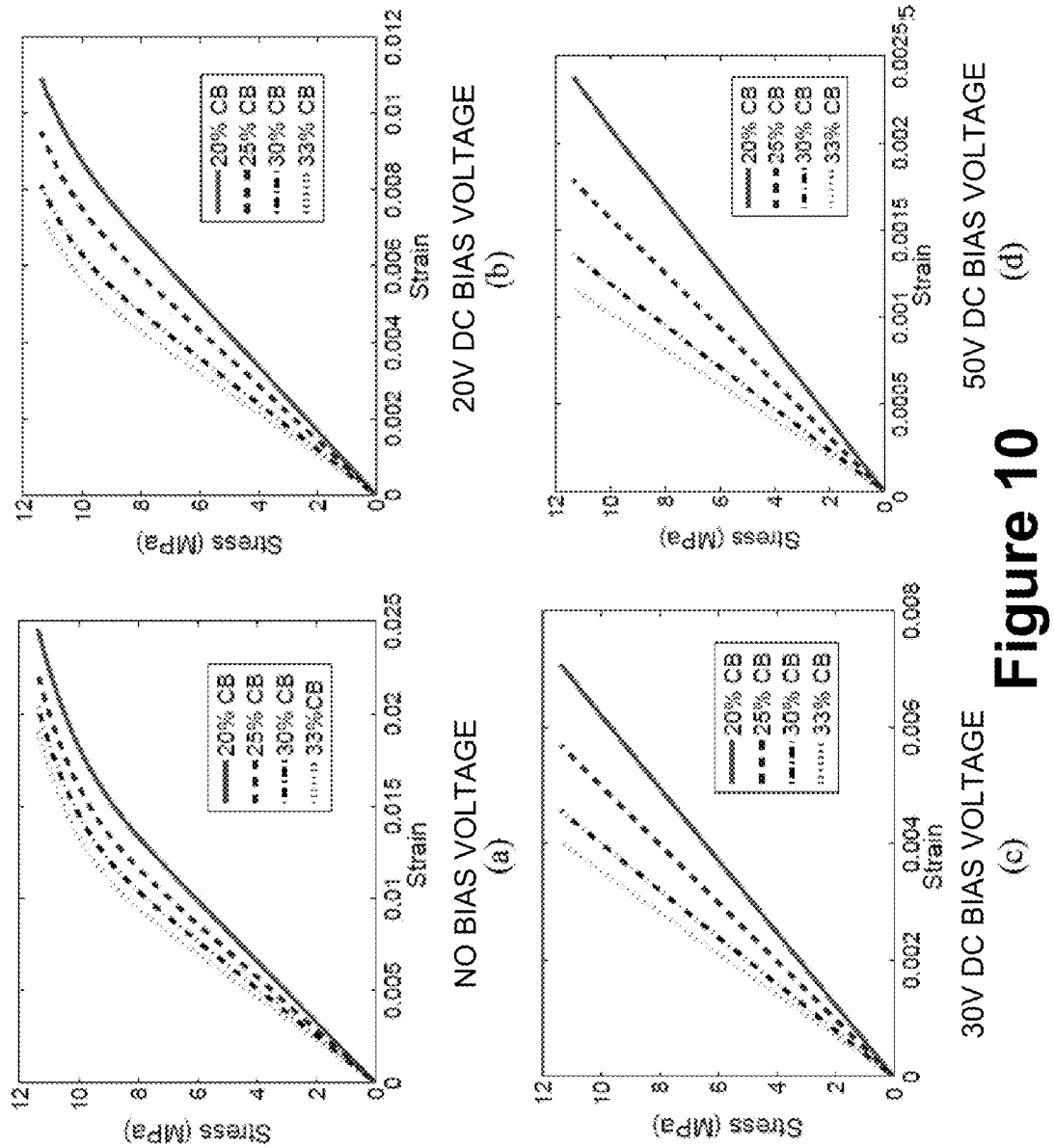
FIG. 10 is an example graph of simulated stress-strain curves for sensors having various volume fractions of carbon black at various bias voltages.

FIG. 10 is an example graph of simulated stress-strain curves for carbon black/epoxy films that have various volume fractions of carbon black at various bias voltages. The volume fractions of carbon black were about 20%, 25%, 30%, and 33%. The stress-strain behavior for all concentrations of carbon black was nonlinear when there is no applied bias voltage and at about 20V bias, as shown in FIG. 10(a)-(b). This may be attributed to the pre-yield softening of the composite films. The nonlinearity was reduced at higher bias voltages of about 40 and about 50V, as shown in FIGS. 10(c)-(d). This may be attributed to the polarization of the carbon atomic chains at higher voltages due to which the material started to stiffen. The stress-strain relationship strongly depended on the carbon black concentration and also the applied electric field. The stiffness of the composites increased with increases in both the filler concentration and the bias voltage. Under zero bias potential, the sample with about 33% by volume of carbon black has the highest stiffness, as seen in FIG. 10(a). Across all concentrations and bias voltages expressed in FIGS. 10(a) to 10(d), the sample with about 33% by volume carbon black at 50V bias voltage has the highest stiffness.

Figure 11:
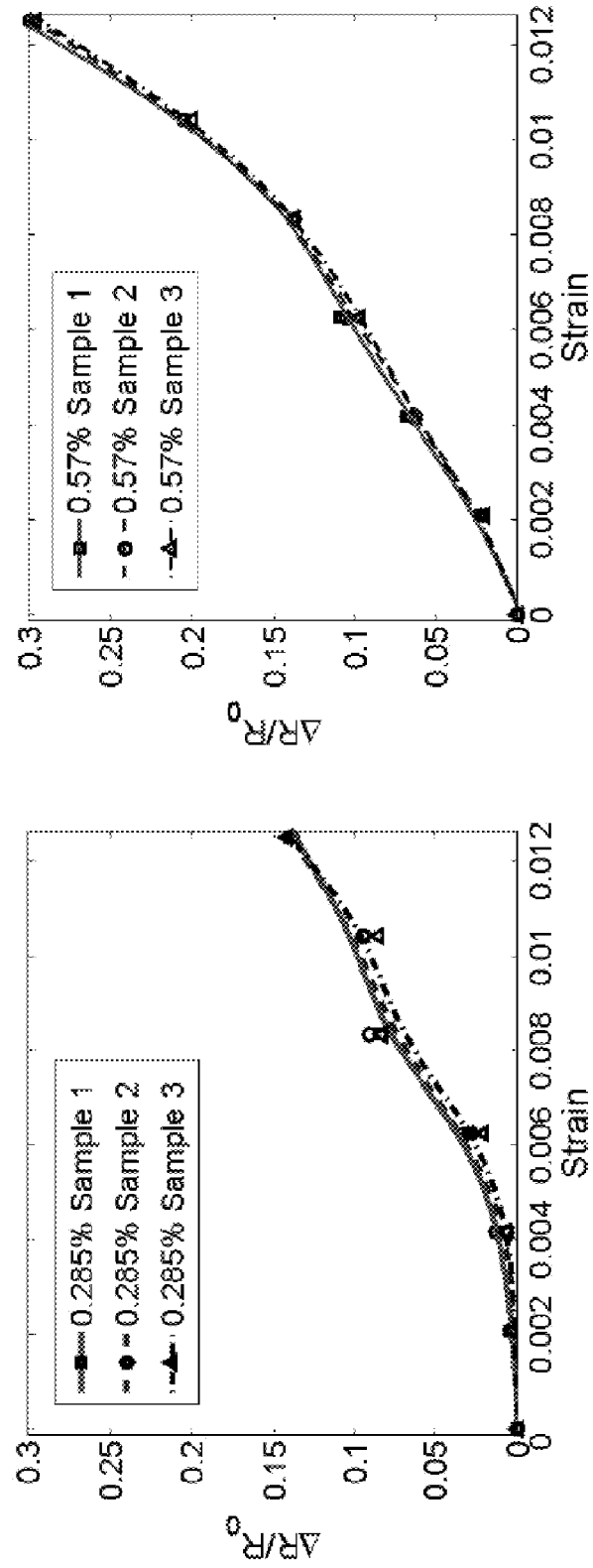
FIG. 11 is an example graph of experimentally-determined strain dependent resistance variations for sensors without an applied bias voltage and with different weight fractions of carbon nanotubes.

FIG. 11 is an example graph of experimentally-determined strain dependent resistance variations for sensors without an applied bias voltage and with different weight fractions of carbon nanotubes. For each of the weight fractions of about 0.285% CNT and about 0.57% CNT, three different samples of the same composition were tested, and the behavior was found to be similar for all the three samples. For strains ranging from 0-0.004, the gauge factor in the case of the film with 0.285% CNT in FIG. 11(a) was less than about 2. For strains over 0.01, the gauge factor in the case of the film with 0.285% CNT was between about 7 and 8. For strains ranging from 0-0.008, the gauge factor in the case of the film with 0.57% CNT in FIG. 11(b) was between about 5 and 7. For strains over 0.01, the gauge factor in the case of the film with 57% CNT was more than about 15. As can be seen in FIGS. 11(a) and 11(b), the gauge factor may increase with CNT concentration; the gauge factor roughly doubled from FIG. 11(a) to FIG. 11(B), as the CNT concentration roughly doubled. A gauge factor of a sensor may be expressed as an average of gauge factors of the sensor over a range of strain. An increase in gauge factor based on an increase in CNT concentration may be realized for concentrations of up to about 20% CNT, or even higher. In FIG. 11(b), the 0.57% CNT samples showed a resistance variation of about 30% at 2% strain which is a difference of almost 234% over a film with CB and epoxy but no carbon nanotubes, for example.

The example strain sensors and methods for sensing strain described herein may be used in a variety of applications. In the bio-medical field, for example, strains in implants, wearable devices, and apparatuses designed to aid patients with physical limitations may be sensed, measured, and monitored. Strain sensing could be an element of the safety monitoring of the structural elements of nuclear reactors. Similarly, example sensors and methods could be used for in-situ measurement of strain on various regular and irregular metallic and composite parts of aerospace vehicles, planes, space shuttles, space crafts, space stations, and planetary re-entry systems, such as those involving thermo-mechanical shock load monitoring. In outer space, for example, example sensors and methods could be used in connection with solar cells, antennas, radiation protection elements, impact probes, robotic arms, and planetary exploration devices. In defense and security fields, for example, strain sensing could be used to monitor highly sensitive areas, such as battlefields and borders; to detect intrusion, perhaps by using pressure fluctuation; and to sense impact loads in armor. Example sensors and methods could be used in the structural health monitoring of critical structures, such as buildings in or around areas of earthquake activity and to estimate stress and strain patterns on critical structural elements. In sports, for example, the strain and stress on sports equipments could be measured, and bio-mechanical reaction forces could be monitored to enhance athlete training Strain sensing could be used to monitor stress, strain, and fatigue in critical microelectronic circuits and systems within consumer electronic devices, and sensor output could be used in feedback based control of home appliances with moving parts.

Micro and nano-scale strain sensors and methods could also be incorporated into micro-electro-mechanical devices. In automotive applications, for example, strain sensors could be used to measure impact and to monitor axel loading or traction. Strain sensors and methods for strain sensing could be used in haptics, particularly in connection with touch-sensitive displays, coatings, and wearable devices. Other applications and uses are also possible.

In other example embodiments, Cobalt may be added to a composite of carbon black, carbon nanotubes, and epoxy. Such an augmented composite may be used for magnetic field sensing in addition to strain sensing. Microwave bombardment of CB/CNT/Co/epoxy composites may improve semi-conducting properties, and this bombardment may be used to design tunable thin films that have controlled dispersion of CNT and Cobalt. Such sensors could be embedded into aerospace composite structures to form a neural network for in-situ measurement of strain to make real time monitoring of the structure possible. Three-axis magnetic field sensors coupled with three-axis accelerometers could be used to sense the distributed state variable in a morphing aircraft. CNT-based magnetoelastic sensors that are highly sensitive to local change of magnetic field could be used as vibration sensors and in applications in which non-contact sensing is essential.

Another example application is as a memristor. Generally, a memristor is a resistor that changes resistance depending on an amount of current that is drawn. The memristor will retain a changed resistance even after the current flow is turned off. Memristors may act as memory cells, with different resistance values corresponding to different states. Memristors may also be used in circuits alongside other passive circuit elements. Certain multilayer nanostructures, including $TiO_2$ multilayers, perovskites, and multiferroic heterostructures may have memristor functions due to a combination of semiconductor, memory, and resistor-like behavior associated with each of the various individual layers. However, multilayer nanostructure memristors are typically brittle, inflexible, costly to fabricate, and energy inefficient. Multilayer nanostructure memristors can also have operational life issues due to electrode incompatibility, and may not be tuned over a wide range. For example, multilayer nanostructure memristors may only be tuned over a range of about 1 to 5 V.

In example embodiments, a memristor may be comprised of an electrically resistant material, conductive nanoparticles dispersed throughout the electrically resistant material, and conductive nano-structures dispersed throughout the electrically resistant material, The electrically resistant material, conductive nanoparticles, and conductive nano-structures have been described above in detail. A memristor may be manufactured in similar ways as, and may have a similar composition to, sensor 102.

Figure 12:
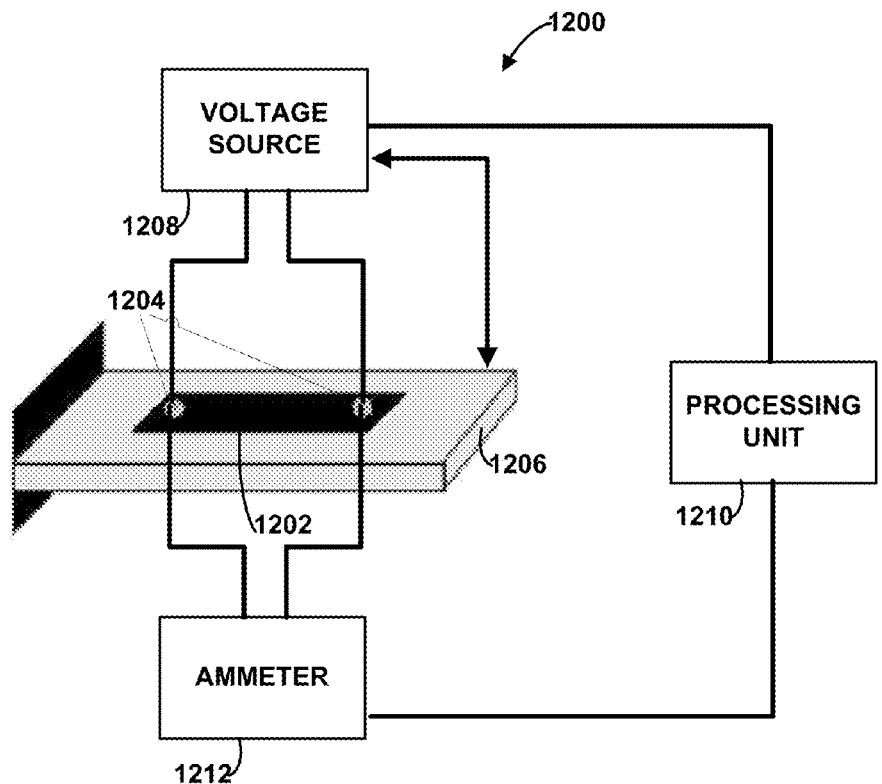
FIG. 12 illustrates a block diagram of an example memristor system.

FIG. 12 illustrates an example memristor system 1200. Memristor system 1200 includes at least one memristor 1202 mounted on a substrate 1206. Memristor 1202 is connected to a voltage source 1208 and an ammeter 1212. A processing unit 1210 is connected to voltage source 1208 and ammeter 1212. Voltage source 1208 is also connected to substrate 1206.

Processing unit 1210 is configured to control operation of memristor 1202 by controlling voltage source 1208 and to detect a state of memristor through measurements received from ammeter 1212. Processing unit 1210 may operate according to an operating system, which may be any suitable commercially available embedded or disk-based operating system, or any proprietary operating system. Further, processing unit 1210 may comprise one or more smaller central processing units, including, for example, a programmable digital signal processing engine or may also be implemented as a single application specific integrated circuit (ASIC) to improve speed and to economize space. In general, it should be understood that processing unit 1210 could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

Voltage source 1208 is capable of supplying voltage to memristor 1202 and substrate 1206. Voltage may be applied to memristor 1202 across electrical terminals 1204. Voltage may be applied to substrate 1206 through electrical terminals that are not shown. Processing unit 1210 may set the voltage that voltage supply 1208 supplies to memristor 1202 and substrate 1206. Voltages supplied to memristor 1202 and substrate 1206 may be DC, AC, or DC and AC.

Substrate 1206 is capable of inducing strain in memristor 1202 because memristor 1202 is bonded atop substrate 1206. Substrate 1206 may be made of a piezoelectric substance that produces strain or stress when the piezoelectric substance is subject to a voltage. When a piezoelectric substance is actuated using AC, or time-varying, voltage, the strain induced in the memristor 1202 bonded to the piezoelectric substrate 1206 may also be time-varying or dynamic strain. One example of a piezoelectric substrate is a lead zirconate titanate (PZT), which may be of varying types having varying properties, and may cover frequencies up to about 10 MHz.

The resistivity of memristor 1202 may change predictably and measurably with both a strain applied to memristor 1202 through substrate 1206 and a voltage applied to memristor 1202 by voltage source 1208. Memristor 1202 may retain the change in resistivity after the applied voltage and applied strain are removed. The resistivity changes may persist for up to about 5-10 seconds. The persistence may be dictated by the magnitude of strain applied; with larger strains, the persistence may be longer. The resistivity of memristor 1202 may vary widely enough that different ranges of resistivity values correspond to different states of memristor 1202. A transition from one state of memristor 1202 to another state of memristor 1202 may occur when a prescribed change in applied voltage, a prescribed change in applied strain, or prescribed changes in both applied voltage and applied strain occur.

Memristor 1202 may have other electrical terminals, gates, or regions (not shown) to which a bias voltage may be applied. Applying a bias voltage may facilitate tuning of memristor 1202 to a desired sensitivity. For example, the range of states of memristor 102 may be dependent on bias voltage.

A change in the resistance of epoxy, carbon black, and carbon nanotube of the memristor 1202 due to an applied uniaxial and torsional strain may be attributed to a dynamic strain dependent band gap change in the CNTs. Additionally, strain may cause a change in a volume fraction of non-conducting epoxy of memristor 1202. Because an elastic moduli of the epoxy matrix differs from those of the carbon black and carbon nanotube fillers, the epoxy deforms more than the carbon black particles and carbon nanotubes under strain. As a result of these effects, resistance of memristor 1202 increases as a function of applied stress. A distortion of the conducting pathway formed in the polymer matrix due to CNT and CB inclusion may also cause resistance to change with applied strain. For example, when strain is applied, the CNTs may change orientation within the epoxy matrix in small degrees, leading to a temporary distortion of conducting pathways through the epoxy matrix. When strain is removed, the CNTs may return to original positions, but this process may not be instantaneous and may therefore yield hysteresis effects.

Figure 13:
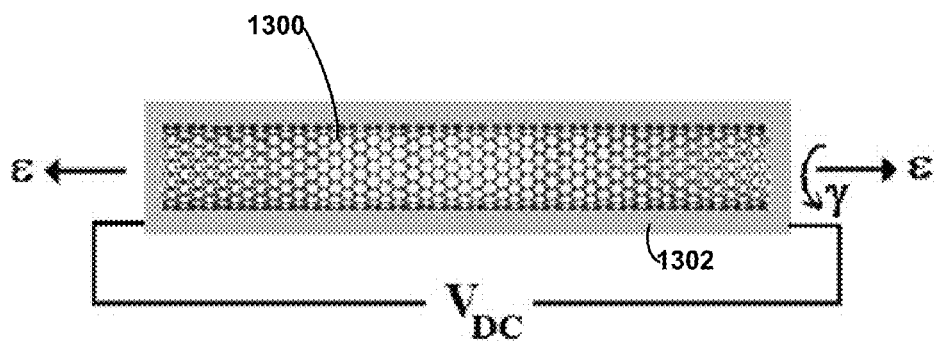
FIG. 13 illustrates a diagram of an example polymerized carbon nanotube subjected to longitudinal and torsional strain.

FIG. 13 illustrates a diagram of polymerized carbon nanotube subjected to longitudinal and torsional strain. A CNT 1300 is surrounded by a polymer coating 1302. Polymer coating 1302 may include polymer chains and conductive nanoparticles. For example, polymer chains may be epoxy resin of any arrangement or structure, and conductive nanoparticles may be carbon black. Memristor 1202, shown in FIG. 12, may include multiple polymerized CNTs, like CNT 1300 and polymer coating 1302.

CNT 1300 may undergo longitudinal deformation as a result of applied longitudinal strain $\epsilon$. CNT 1300 may undergo torsional deformation as a result of applied torsional strain $\gamma$. Polymer coating 1302 may act as both a mechanical constraint, for instance as a structure surrounding CNT 1300, and an interface resistive layer. The deformation of CNT 1300 may affect a resistivity of CNT 1300, and therefore, may also affect an amount of current drawn through CNT 1300 when a DC voltage is applied as shown.

Returning to FIG. 12, processing unit 1210 may instruct voltage source 1208 to apply a certain voltage, voltage function, or series of voltages to memristor 1202. Additionally, processing unit 1210 may instruct voltage source 1208 to apply a certain voltage, voltage function, or series of voltages to substrate 1206 so that substrate creates strain in memristor 1202. Processing unit 1210 may send these instructions to induce a certain state or series of states in memristor 1202. For example, memristor 1202 may function as a memory cell with different states corresponding to different stored values. Processing unit 1210 may use the foregoing Equations to determine what voltages and strains need to be applied to memristor 1202 to obtain the desired state or states. For example, processing unit 1210 may determine a desired resistance value to correspond to a desired state. Processing unit 1210 may then determine the conductivity of the memristor ($\kappa_{eff}$) corresponding to the desired resistance using Equation 14. Processing unit 1210 may obtain $\kappa_e$ from Equation 8. Using the determined $\kappa_{eff}$ and $\kappa_e$ values, processing unit 1210 may solve Equation 11 for the desired value of applied strain ($\epsilon_{xx}$). In Equation 11, all terms except $\kappa_{eff}$, $\epsilon_{xx}$ and $\kappa_e$ may be constants.

Alternately, processing unit 1210 may have access to look-up tables that map resistivity value ranges of memristor 12202 to a list of states, look-up tables that map values of applied voltage to substrate 1206 to values of applied strain to memristor 1202, and look-up tables that map values applied voltage and values of applied strain to memristor 1202 to transitions between denominated states of memristor 1202. Such a look-up tables may be generated when memristor 1202 is designed, constructed, or calibrated. Processing unit 1210 causing state transitions in memristor 1202 may correspond to data write operations for a memory cell.

Processing unit 1210 may also detect a previously set state of memristor 1202. For example, after memristor 1202 has been initialized or set to a particular state, memristor 1202 will have a resistivity value that corresponds to that particular state. Therefore, to detect the state of memristor 1202, processing unit 1210 may determine the resistivity of memristor 1202. For example, processing unit 1210 may instruct voltage source 108 to apply a constant voltage across memristor 1202. Processing unit 1210 may then receive a measurement from ammeter 1212, which may be any device capable of measuring current, of current drawn by memristor 1202. Processing unit 1210 may use current measurements from ammeter 1212 to determine a resistivity of memristor 1202. Processing unit 1210 may then determine the state of memristor 1202 from the determined resistivity value. For example, processing unit 1210 may access a look-up table that maps resistivity values to states of memristor 1202. Processing unit 1210 detecting a state of memristor 1202 may correspond to data read operations for a memory cell, for example.

FIG. 12 shows one example of a use of memristor 1202. Memristor 1202 may be set in another environment, however. For instance, memristor 1202 may be one element or a series of elements that are arranged in a circuit with other active and passive circuit elements. In other arrangements, memristor 1202 may not be connected to a voltage source, an ammeter, or a substrate. Rather than being connected to a voltage source 1208, memristor may be connected to another power source or may draw power from a circuit. Rather than being mounted on a substrate 1206, memristor 1202 may be connected to another mechanism or apparatus, or subjected to a treatment, that is capable of applying strain across memristor 1202. For instance, a laser beam may be applied to memristor 1202 to create temperature-induced strain. As other example, example memristor system 1200 may be connected to an example computing device such as is shown in FIG. 3.

Memristor 1202 may be doped with magnetic particles and a magnetic field may be applied to memristor 1202 to create strain through magnetorestriction. Additionally, a solid or fluid gel-type coating may be applied to memristor 1202, and a changing pH or electromagnetic radiation may be applied to cause the coating to apply strain to memristor 1202.

Figure 14:
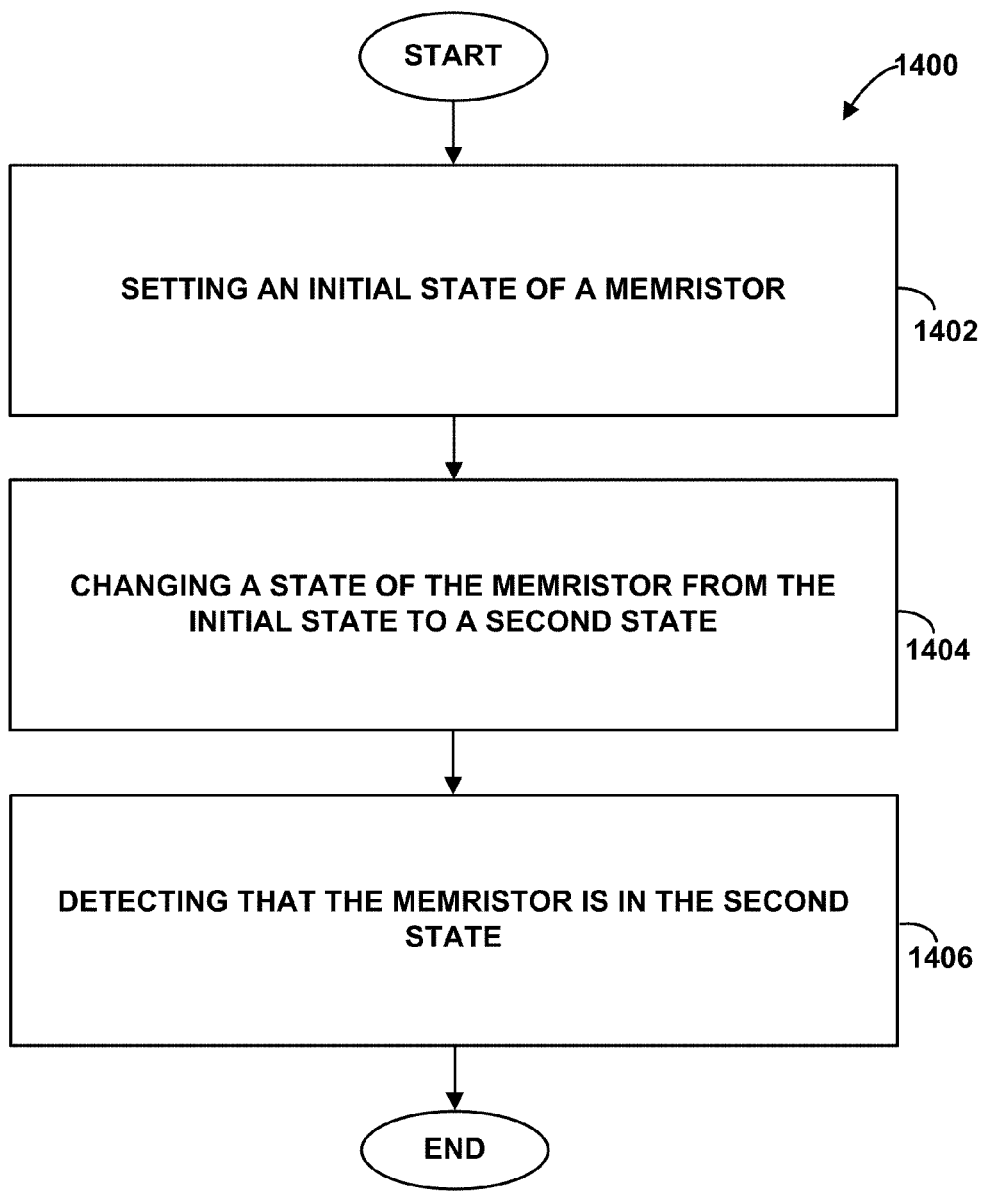
FIG. 14 is a flowchart that depicts example steps of a method for operating an example memristor.

FIG. 14 is a flowchart that depicts example steps of a method for operating an example memristor. FIG. 14 shows functionality and operation of one possible implementation of present embodiments and should not be taken to limit the number, order, separation, combination, addition, or deletion of steps in other method embodiments. Method 1400 is described herein with reference to FIG. 12, but may be used in other contexts. Method 1400 begins at block 1402, where an initial state of a memristor 1202 is set. In example memristor system 1200, voltage source 1208 may apply voltages to memristor 1202 and to substrate 1206. The voltage applied to substrate 1206 may cause substrate 1206 to induce a strain in memristor 1202. The combination of applied voltage and applied strain may affect the resistivity of memristor 1202. The resistivity of memristor 1202 after the application of voltage and strain may correspond to an initial state of memristor 1202. The application of voltages to memristor 1202 and substrate 1206 by voltage source 1208 may be directed by processing unit 1210. The setting of the initial state of memristor 1202 at block 1402 may involve applying a voltage or applying a strain to memristor 1202, or applying both, for example.

At block 1404, the state of memristor 1202 is changed from the initial state to a second state. In example memristor system 1200, voltage source 1208 may apply voltages to memristor 1202 and to substrate 1206. The voltage applied to substrate 1206 may cause substrate 1206 to induce a strain in memristor 1202. The voltages and strains applied to memristor 1202 may be time-varying. The combination of applied voltage and applied strain may affect the resistivity of memristor 1202. In particular, the combination of applied voltage and applied strain may change the resistivity of memristor 1202 from a resistivity that corresponds to the initial state, an initial resistivity value, to a resistivity that corresponds to the second state of memristor 1202, a second resistivity value. The application of voltages to memristor 1202 and substrate 1206 by voltage source 1208 in block 1404 may be directed by processing unit 1210. Processing unit 1210 may determine a sequence of applied voltages and applied strains based on the initial state of memristor 1202 and state transitions of memristor 1202 derived from the foregoing Equations or look-up tables. The changing of the state of memristor 1202 from the initial state to the second state at block 1404 may involve any combination of applying voltage and applying strain. For example, the voltage may be held constant across memristor 1202 while the strain applied to memristor 1202 varies with time, or the strain may be held constant across memristor 1202 while the voltages applied to memristor 1202 varies with time. Additionally, both the applied voltage and the applied strain across memristor 1202 may be time varied to cause the state of memristor 1202 to change.

Next, at block 1406, the state of memristor is detected to be the second state. For example, to detect the state of memristor 1202, processing unit 1210 may determine the resistivity of memristor 1202. For example, processing unit 1210 may instruct voltage source 1208 to apply a constant voltage across memristor 1202. Processing unit 1210 may then receive a current measurement from ammeter 1212 to measure the current drawn by memristor 1202. Processing unit 1210 may use the current measurement to calculate a resistivity of memristor 1202. Processing unit 1210 may then determine the state of memristor 1202 from the determined resistivity value. For example, processing unit 1210 may access a look-up table that maps resistivity values to states of memristor 1202. Processing unit 1210 may use the determined resistivity value to detect that memristor 1202 is in the second state, by correlating the determined resistivity value to the second resistivity.

The method 1400 may include other steps. For instance, a temperature of the memristor 1202 may be measured or controlled, and, with fluctuations or extremes of temperature, the range of available states and the transitions from state to state of memristor 1202 may depend on the temperature. At constant temperatures around ambient or room temperatures, the states and transitions of memristor 1202 may not depend on temperature. As another example, a residual strain or stress bearing on memristor 1202 may be ascertained, in which case the range of available states and the transitions from state to state of memristor 102 may depend on the residual strain. Residual strain may be present because of deformations of a substrate or a mould during a manufacturing process; and residual strain may be ascertained by comparing memristor 1202 to a residual-strain-free memristor. As yet another example, an externally controlled mechanically applied strain may be applied to the memristor 1202, in which case the range of available states and the transitions from state to state of memristor 1202 would take into account the mechanically applied strain.

In one example, memristor 1202 comprises CNTs and carbon black dispersed substantially through an epoxy resin and displays dynamic strain sensing behavior. For example, when a constant input bias voltage is maintained, such as at 5V DC, few memory effects may be displayed by memristor 102.

In one example embodiment, a memristor may include CNTs without a polymer coating. FIG. 15 is an example graph of a simulation of a resistance of a carbon nanotube without a polymer coating varying with strain and time. A dynamic strain input is a sinusoid, and a frequency and phase of oscillation of $\Delta R/R_0$ are the same as those of the dynamic strain input sinusoid. A time-independent scaling factor accounts for relative difference in magnitudes between the dynamic strain input sinusoid and the dynamic output $\Delta R/R_0$ sinusoid. The resistivity of the CNT without a polymer coating varies predictably with a repeating time-varying dynamic input.

In another example embodiment, a memristor may comprise a composite that has approximately 33% by volume carbon nanoparticles and less than approximately 1% by volume CNTs dispersed substantially throughout an epoxy resin. FIG. 16 is an example graph of time-varying resistance of the example composite varying with input dynamic strain at a frequency of 100 Hz with a bias voltage of 5V. FIG. 17 is an example graph of time-varying resistance of the example composite varying with input dynamic strain a frequency of 500 Hz with a bias voltage of 5V. As with the prior example memristor comprising a carbon nanotube, the composite has a time-varying resistance change of the same frequency and phase as that of the input dynamic strain for an input frequency of 100 Hz (FIG. 16) and an input frequency of 500 Hz (FIG. 17). A five-fold increase in dynamic strain input frequency from FIG. 16 to FIG. 17 yields a commensurate increase in a time-independent scaling factor of $\Delta R/R_0$. Such a relationship between magnitude of resistance change and frequency of dynamic strain input can be used to tune a memristor.

Figure 18:
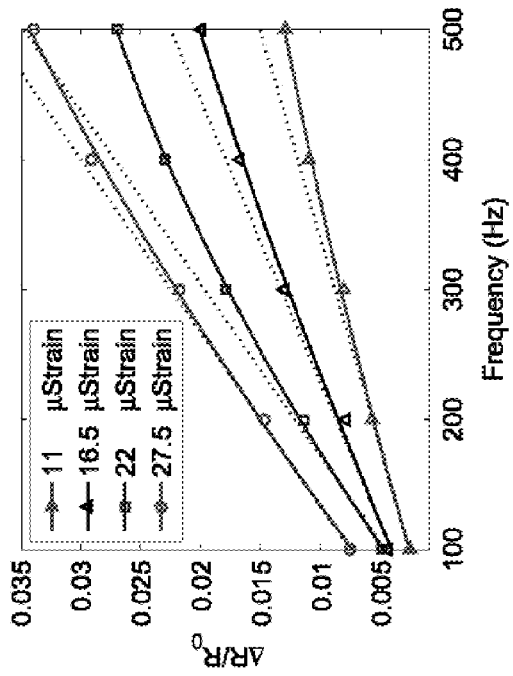
FIG. 18 is an example graph of peak-to-peak $\Delta R/R_0$ of a carbon nanotube, carbon black, and epoxy composite varying with frequency and bias voltage.

FIG. 18 is an example graph of peak-to-peak $\Delta R/R_0$ of another example memristor comprising carbon nanotube, carbon black, and epoxy composite varying with magnitude and frequency of input bias voltage. Simulations were performed with this example composite including approximately 0.57% CNTs by weight, mounted on a piezoelectric substrate and being subjected to a constant amplitude of mechanical excitation by the piezoelectric substrate. Simulations were performed using six different bias voltages—5V, 10V, 20V, 30V, 40V, and 50V—each swept through a range of frequencies from 0-500 Hz. A magnitude of a range of $\Delta R/R_0$ increased with increasing frequency and decreased with increasing bias voltage. Such a relationship between magnitude of resistance change and frequency and magnitude of bias voltage input can be used to tune a memristor.

Figure 19:
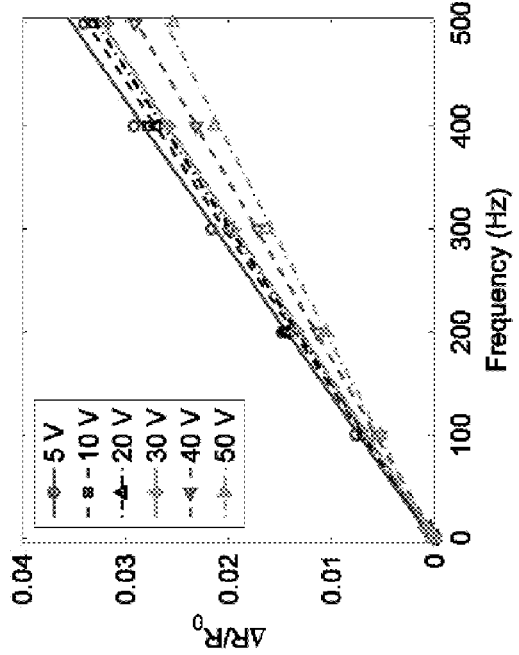
FIG. 19 is an example graph of peak-to-peak $\Delta R/R_0$ of a carbon nanotube, carbon black, and epoxy composite varying with frequency and strain.

FIG. 19 is an example graph of peak-to-peak $\Delta R/R_0$ of the same composite used for FIG. 18 varying with magnitude and frequency of input strain, at a 5V bias voltage. The dynamic strain was induced through a piezoelectric substrate upon which the composite was mounted. An amplitude of an induced dynamic strain was computed using a known response of the piezoelectric substrate under applied AC voltage. $\Delta R/R_0$ increases at low and moderate frequencies and then tends to saturate at higher frequencies.

Figure 20:
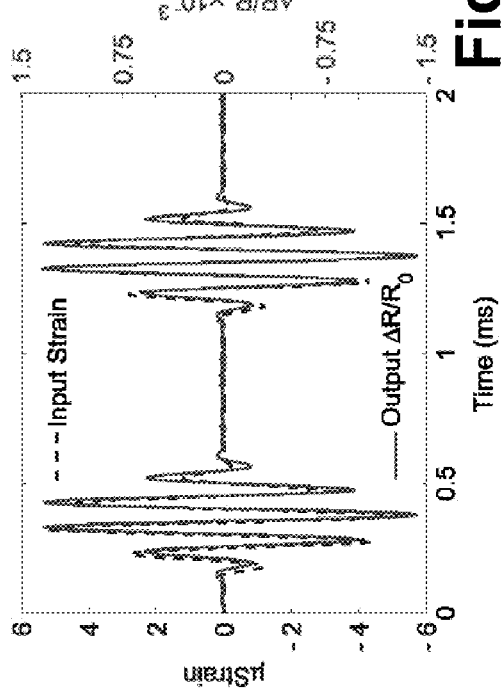
FIG. 20 is an example graph of time-varying resistance of a carbon nanotube, carbon black, and epoxy composite varying with dynamic strain input in the form of a modulated sine pulse.

FIG. 20 is an example graph of time-varying resistance of the same composite used for FIGS. 18 and 19 varying with a dynamic strain input in the form of a modulated sine pulse. $\Delta R/R_0$ has the frequency and phase of the input modulated sinusoid, and the magnitude of $\Delta R/R_0$ changes with changes in the magnitude of the input strain sinusoid.

Figure 21:
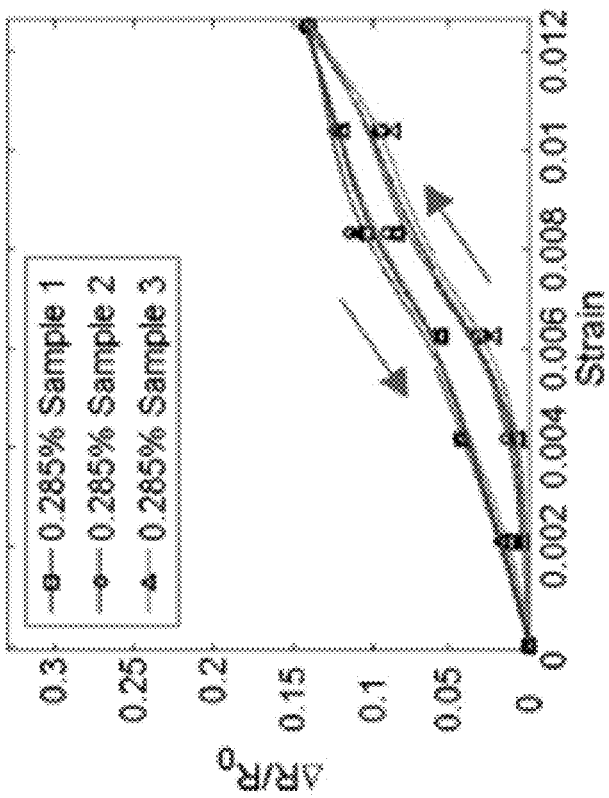
FIG. 21 is an example hysteretic response of an example of carbon nanotube, carbon black, and epoxy composite during the application of strain and the release of strain.

FIG. 21 is an example hysteretic response of an example memristor comprising carbon nanotube, carbon black, and epoxy composite during application of strain and release of strain. The example composite has approximately 33% carbon nanoparticles by volume and approximately 0.285% CNTs by weight dispersed substantially throughout an epoxy resin matrix. Behavior of the example composite depends on which of two loading cycles has recently occurred. During loading, strain applied to the example composite increases steadily, from no strain to a maximum amount of strain. During the loading cycle, the resistance of the example composite increases with increased strain in a non-linear manner, as shown in the lower curve labeled with the arrow pointing upwards and to the right of FIG. 21. The other cycle is unloading, during which strain applied to the example composite is gradually released beginning with a maximum amount of strain to no strain. During the unloading cycle, the resistance of the example composite decreases with decreased strain in a non-linear manner, as shown in the upper curve, labeled with the arrow pointing downwards and to the left of FIG. 21.

Because the magnitude and rate of change of the resistance of the example composite differs during the loading and unloading cycle, the example composite shown in FIG. 21 may be a two-state memristor. For example, method 1400 may be performed using the example composite of FIG. 21. The example composite may be in a beginning state in which neither voltage nor strain is being applied to the example composite. A constant bias voltage of 5V may be applied to the example composite throughout the operation of method 1400, for example. At block 1402, the example composite may be set to an initial state. This may be accomplished by gradually loading the example composite with increasing strain until a set strain value in the middle of the loading curve is attained. A set strain value may be chosen so that the difference between resistivities—the space between the loading and unloading curves—at the set strain value is large, relative to the resistivity differences along other points of the strain axis. The resistivity of the example composite on the lower loading curve at the set strain value may be the initial state of the example composite. At block 1404, the state of the example composite may be changed from the initial state to a second state. This may be accomplished by gradually loading the example composite until the maximum strain is achieved, and then releasing the strain until the set strain value is again achieved. The resistivity of the example composite on the upper unloading curve at the set strain value may be the second state of the example composite. At block 1406, the second state of the example composite may be detected by determining the resistivity of the example composite. The example composite may retain the changed resistivity for about 5 to 10 seconds, during which the second state may be detected. With that persistence in resistivity change, the state effect may be referred to as non-volatile. When the determined resistivity is the resistivity of the example composite at the set strain value on the upper unloading curve, rather than the resistivity of the example composite at the set strain value on the lower loading curve, the second state of the example composite is detected. The example composite may be returned to the initial state by releasing the strain applied to the example composite until no strain is applied (or substantially no strain is applied), and then applying strain until the set strain value is again achieved.

Figure 22:
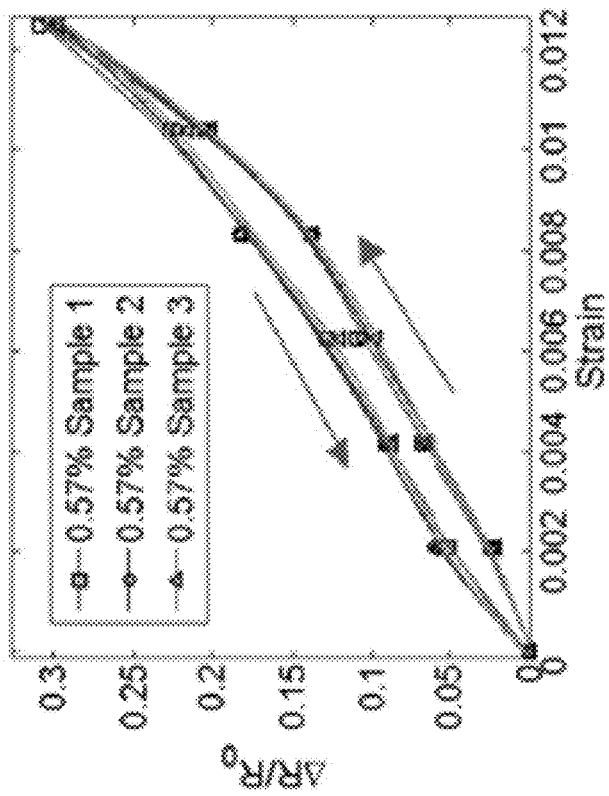
FIG. 22 is an example hysteretic response of another example of carbon nanotube, carbon black, and epoxy composite during the application of strain and the release of strain.

FIG. 22 is an example hysteretic response of another example memristor comprising carbon nanotube, carbon black, and epoxy composite during the application of strain and the release of strain. The example composite has approximately 33% carbon nanoparticles by volume and approximately 0.57% CNTs by weight dispersed substantially throughout an epoxy resin matrix. Behavior of the example composite depends on which of two loading cycles has recently occurred (or most recently occurred). During loading, strain applied to the example composite increases steadily from no strain to a maximum amount of strain. During the loading cycle, the resistance of the example composite increases with increased strain in a non-linear manner, as shown in the lower curve, labeled with the arrow pointing upwards to the right of FIG. 22. The other cycle is unloading, during which strain applied to the example composite is gradually released beginning with a maximum amount of strain to no strain. During the unloading cycle, the resistance of the example composite decreases with decreased strain in a non-linear manner, as shown in the upper curve, labeled with the arrow pointing downwards to the left of FIG. 22.

Like the example composite shown in FIG. 21, because a magnitude and rate of change of the resistance of the example composite used in simulations shown in FIG. 22 differs during the loading and unloading cycle, the example composite shown in FIG. 22 may be a two-state memristor. For example, method 1400 may be performed using the example composite of FIG. 22. The example composite may be in a beginning state in which neither voltage nor strain is being applied to the example composite. A constant bias voltage of 5V may be applied to the example composite throughout the operation of method 1400, for example. At block 1402, the example composite may be set to an initial state. This may be accomplished by gradually loading the example composite with increasing strain until a set strain value in the middle of the loading curve is attained. A set strain value may be chosen so that the difference between resistivities—the space between the loading and unloading curves—at the set strain value is large, relative to the resistivity differences along other points of the strain axis. The resistivity of the example composite on the lower loading curve at the set strain value may be the initial state of the example composite. At block 1404, the state of the example composite may be changed from the initial state to a second state. This may be accomplished by gradually loading the example composite until the maximum strain is achieved, and then releasing the strain until the set strain value is again achieved. The resistivity of the example composite on the upper unloading curve at the set strain value may be the second state of the example composite. At block 1406, the second state of the example composite may be detected by determining the resistivity of the example composite. The example composite may retain the changed resistivity for about 5 to 10 seconds, during which the second state may be detected. With that persistence in resistivity change, the state effect may be referred to as non-volatile. When the determined resistivity is the resistivity of the example composite at the set strain value on the upper unloading curve, rather than the resistivity of the example composite at the set strain value on the lower loading curve, the second state of the example composite is detected. The example composite may be returned to the initial state by releasing the strain applied to the example composite until no strain is applied, and then applying strain until the set strain value is again achieved.

Figure 23:
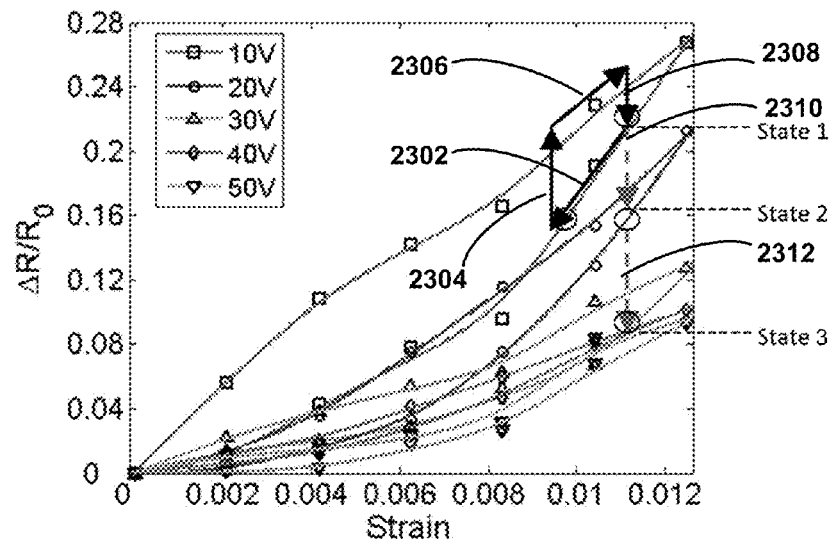
FIG. 23 is an example hysteretic response of yet another example of carbon nanotube, carbon black, and epoxy composite during the application of strain and the release of strain at different bias voltages, with example state switching shown.

FIG. 23 is an example hysteretic response of yet another example memristor comprising carbon nanotube, carbon black, and epoxy composite during strain loading and unloading cycles at different bias voltages with example state switching shown. The example composite has approximately 33% carbon nanoparticles by volume and approximately 0.57% CNTs by weight dispersed substantially throughout an epoxy resin matrix. Behavior of a three-state memristor of the example composite is shown in FIG. 23 with each state corresponding to a different resistivity value of the example composite. From state 1, which corresponds to a $\Delta R/R_0$ of approximately 0.22, two state transitions are shown. A state transition 2302 involves changing the applied strain but keeping the bias voltage constant at approximately 10V. After performing state transition 2302, a state 2, which corresponds to a $\Delta R/R_0$ of approximately 0.16, is achieved. Still maintaining a constant bias voltage, the example composite may return to state 1 from state 2 by performing state transitions 2304, 2306, and 2308, which include changing the applied strain. Back at state 1, a state transition 2310 may be performed to transition to state 2. State transition 2310 is achieved by holding the applied strain constant, but changing the bias voltage from 10V to 20V. Back at state 2, a state transition 2312 may be performed to transition to state 3, which corresponds to a $\Delta R/R_0$ of approximately 0.08. As with state transition 2308, state transition 2312 involves holding the applied strain constant, and changing the bias voltage from 20V to 30V. The foregoing are just examples, and many other states and state transitions may be mapped onto the behavior of the example composite shown in FIG. 23.

Figure 24:
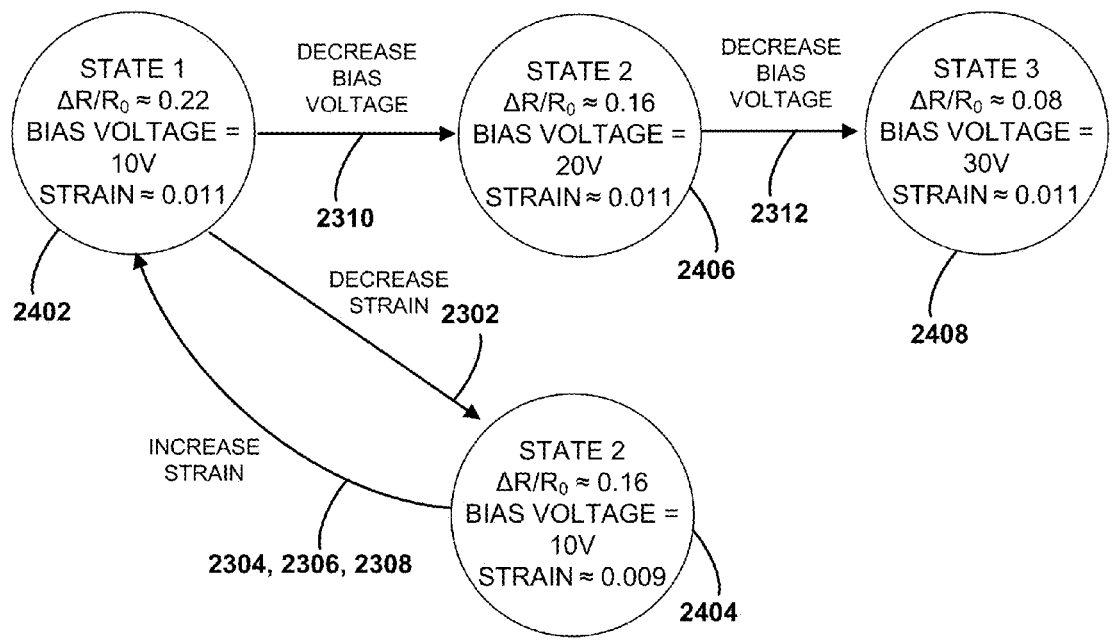
FIG. 24 is a state diagram describing the states and transitions from FIG. 23.

FIG. 24 is a state diagram describing the states and transitions discussed above with respect to FIG. 23. A state 2402 is state 1, corresponding to a $\Delta R/R_0$ of approximately 0.22, a bias voltage of 10V, and an applied strain of approximately 0.011. From state 2402, state transition 2302 may be applied to reach a state 2404, which is state 2, corresponding to a $\Delta R/R_0$ of approximately 0.16, a bias voltage of 10V, and an applied strain of approximately 0.009. State transition 2302 is a net decrease in the applied strain, but state transition 2302 may involve moving along the loading and unloading curves at bias voltage 10V. From state 2404, state transitions 2304, 2306, and 2308 may be applied to return to state 2402. State transitions 2304, 2306, and 2308 yield a net increase in the applied strain, but state transitions 2304, 2306, and 2308 may involve moving along the loading and unloading curves at bias voltage 10V. From state 2402, state transition 2310 may be applied to reach a state 2406, which is state 2, corresponding to a $\Delta R/R_0$ of approximately 0.16, a bias voltage of 20V, and an applied strain of approximately 0.011. State transition 2310 involves increasing the bias voltage from 10V to 20V. From state 2406, state transition 2312 may be applied to reach a state 2408, which is state 3, corresponding to a $\Delta R/R_0$ of approximately 0.08, a bias voltage of 30V, and an applied strain of approximately 0.011. State transition 2312 involves increasing the bias voltage from 20V to 30V.

Figure 25:
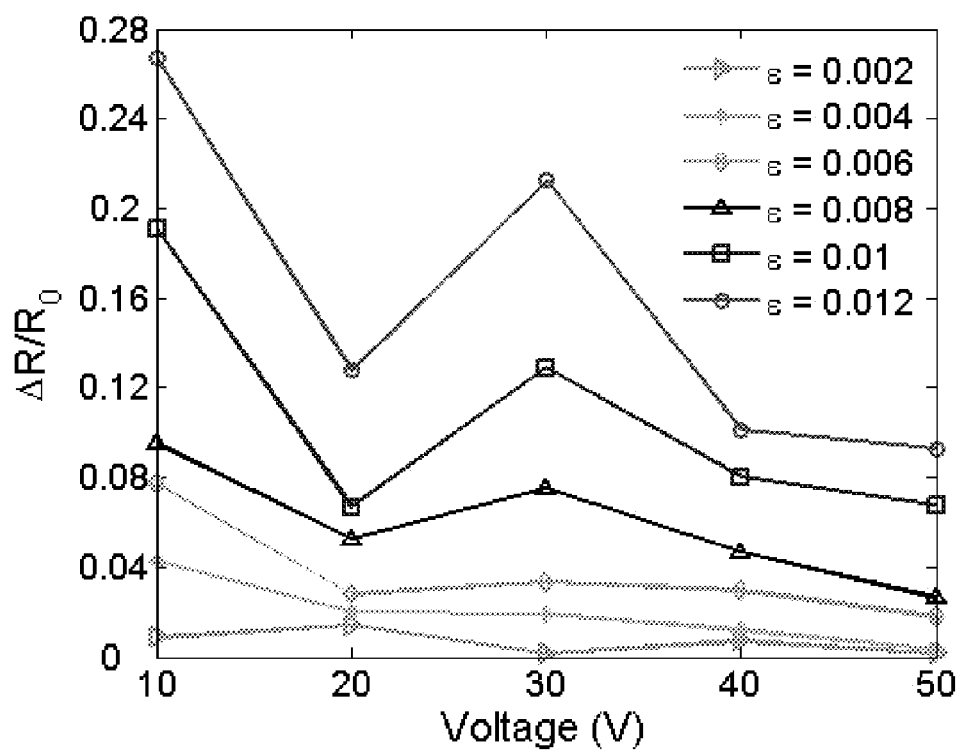
FIG. 25 is an example hysteretic response during voltage changes at different constant values of strain.
Figure 10:
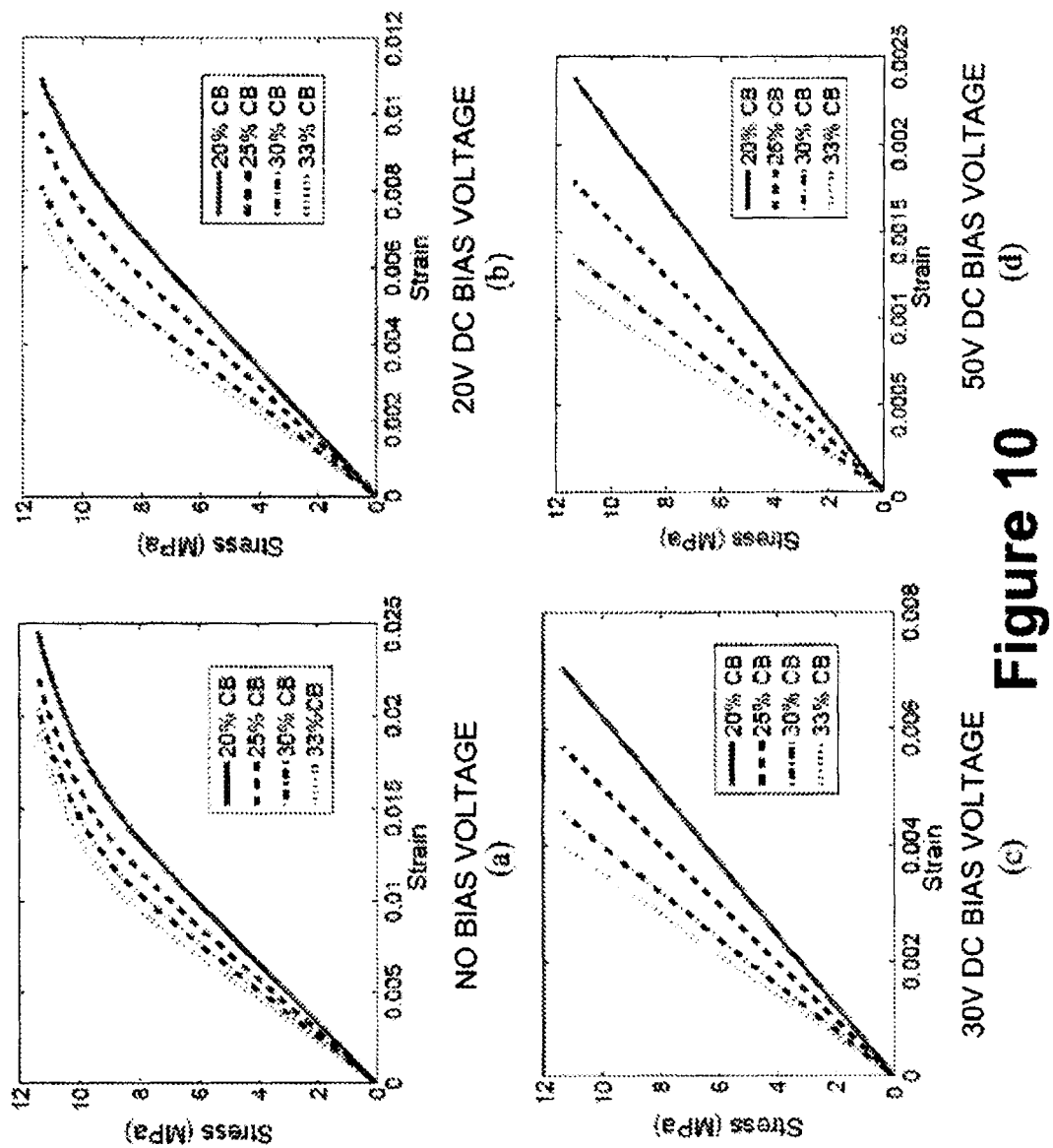

FIG. 25 is an example hysteretic response during voltage changes at different constant values of strain of the example composite in the loading state as described above with reference to FIG. 23. The same states and transitions may be mapped onto FIG. 25, but in FIG. 25, state transitions involving changes in bias voltages would be state transitions traveling along a curve, and state transitions involving changes in applied strain would be state transitions that jump from one curve to another. Again, many other states and state transitions may be mapped onto the behavior of the example composite shown in FIG. 25.

The foregoing is one description of properties and operation of a carbon black, carbon nanotube, and epoxy embodiment of memristor 1202; however other descriptions of the properties and operation of such a composite, and other memristor composites, are possible.

The example memristors and methods for operating memristors described herein may be used in a variety of fields and applications, such as in high-performance computing, polymer-based electronics, polymer-based memory devices, non-volatile memory systems, information processing, brain-computer interfaces, super capacitors, adaptive sensors, biomimetics, consumer electronics, automotive systems, industrial applications, bio-medical fields, nuclear energy technology, outer space, defense and security fields, micro-electro-mechanical devices, and energy sectors. Example memristors may function as circuit elements or memory cells. Other applications and uses are also possible.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A composite comprising:
an electrically resistant material, wherein the electrically resistant material comprises epoxy resin;
conductive nanoparticles dispersed substantially throughout the electrically resistant material; and
conductive nano-structures dispersed substantially throughout the electrically resistant material, wherein a weight of the conductive nano-structures is less than about 5% of a total weight of the composite, wherein a gauge factor of the composite is greater than about 4.

2. The composite of claim 1, wherein a volume of the conductive nanoparticles is approximately 33% of a total volume of the composite.

3. The composite of claim 1, wherein the conductive nanoparticles comprise amorphous carbon.

4. The composite of claim 3, wherein the amorphous carbon comprises carbon black.

5. The composite of claim 1, wherein the conductive nanoparticles are of at least one of the following types: platinum, silver, copper, and polyanylene.

6. The composite of claim 1, wherein the conductive nanostructures comprises carbon nanotubes.

7. The composite of claim 6, wherein the carbon nanotubes include at least about 99% carbon and less than about 1% impurities.

8. A thin film sensor comprising:
a thin film polymer matrix having two electrical terminals;
conductive nanoparticles dispersed within the thin film polymer matrix; and
carbon nanotubes dispersed within the thin film polymer matrix, wherein the thin film sensor has a resistivity across the two electrical terminals that varies with a magnitude of strain applied to the thin film sensor;

wherein the thin film sensor has two operational modes, wherein a first operational mode is a resistive-type strain sensing mode and wherein a second operational mode is a semiconductor-type strain sensing mode, and wherein a bias voltage applied across the thin film sensor determines the operational mode.

9. The thin film sensor of claim 8, wherein the conductive nanoparticles have a volume of approximately 33% of a total volume of the thin film sensor, and wherein the carbon nanotubes have a weight that is less than about 5% of a total weight of the thin film sensor.

10. The thin film sensor of claim 8, wherein the conductive nanoparticles comprise carbon black, and wherein the thin film polymer matrix comprises epoxy resin.

11. The thin film sensor of claim 8, wherein a range of resistivity values are mapped onto a range of magnitude of applied strain values, such that a measured resistivity corresponds to a value of the magnitude of applied strain.

12. The thin film sensor of claim 8, wherein the carbon nanotubes are randomly aligned.

13. A method for sensing strain comprising:
applying a voltage to a flexible thin film strain sensor that is applied to a sensing area, wherein the flexible thin film strain sensor comprises an electrically resistant material, conductive nanoparticles dispersed substantially throughout the electrically resistant material, and conductive nano-structures dispersed substantially throughout the electrically resistant material, wherein the flexible thin film strain sensor has a resistivity that varies with a magnitude of strain applied to the thin film sensor, and wherein a strain is present across the sensing area;
applying a bias voltage across the flexible thin film strain sensor;
detecting an electrical response of the flexible thin film strain sensor in response to the strain present across the sensing area; and
determining a magnitude of the strain based on the electrical response and the bias voltage.

14. The method of claim 13, further comprising measuring a temperature of the flexible thin film strain sensor, and wherein determining the magnitude of the strain comprises determining the magnitude of the strain based on the electrical response and on the temperature.

15. The method of claim 13, further comprising ascertaining a residual strain of the flexible thin film strain sensor, and wherein determining the magnitude of the strain comprises determining the magnitude of the strain based on the electrical response and on the residual strain.

* * * * *

UNITED STATES PATENT AND TRADEMARK OFFICE
CERTIFICATE OF CORRECTION

PATENT NO. : 8,250,927 B2
APPLICATION NO. : 12/726091
DATED : August 28, 2012
INVENTOR(S) : Anand et al.

It is certified that error appears in the above-identified patent and that said Letters Patent is hereby corrected as shown below:

Title Page 2, in Field (56), under "OTHER PUBLICATIONS", in Column 1, Line 8, delete "475503. pdf>*" and insert -- 475503.pdf>* --, therefor.

Title Page 2, in Field (56), under "OTHER PUBLICATIONS", in Column 1, Line 64, delete "andStructures" and insert -- and Structures --, therefor.

Title Page 2, in Field (56), under "OTHER PUBLICATIONS", in Column 1, Line 71, delete "Workshopon" and insert -- Workshop on --, therefor.

Title Page 2, in Field (56), under "OTHER PUBLICATIONS", in Column 2, Line 30, delete "ParksMD, BoyceCM," and insert -- Parks M D, Boyce C M, --, therefor.

Title Page 2, in Field (56), under "OTHER PUBLICATIONS", in Column 2, Line 35, delete "basedmass" and insert -- based mass --, therefor.

Title Page 2, in Field (56), under "OTHER PUBLICATIONS", in Column 2, Line 38, delete "composites Composites" and insert -- composites --, therefor.

Title Page 2, in Field (56), under "OTHER PUBLICATIONS", in Column 2, Line 63, delete "singlewalled" and insert -- single-walled --, therefor.

In Fig. 3, Sheet 2 of 16, below "PROCESSOR 304", in Line 1, delete "uP/uC" and insert -- μP/μC --, therefor.

Delete sheet 8 of 16, and substitute the attached sheet containing fig. 10 therefor.

In Column 1, Line 12, delete "(MEMs)-based" and insert -- (MEMS)-based --, therefor.

In Column 7, Line 55, delete "$E_{cb}$," and insert -- $E_{cb}$ --, therefor.

Signed and Sealed this
Eighth Day of January, 2013

David J. Kappos
*Director of the United States Patent and Trademark Office*

In Column 8, Line 2, delete "102" and insert -- 102. --, therefor.

In Column 9, Line 27, in Equation, delete "$\left[\frac{E_{ef}f\left(f_{cb}^2 N_1 + f_{cb}\left(N_2 E_{eff} + N_3\right)\right)}{\left(f_{cb}^2 M_1 + f_{cb}\left(M_2 E_{eff} + M_3\right) + \left(M_4 E_{eff}^2 + M_5 E_{eff} + M_6\right)\right)}\right]$," and insert -- $\left[\frac{E_{eff}\left(f_{cb}^2 N_1 + f_{cb}\left(N_2 E_{eff} + N_3\right)\right)}{\left(f_{cb}^2 M_1 + f_{cb}\left(M_2 E_{eff} + M_3\right) + \left(M_4 E_{eff}^2 + M_5 E_{eff} + M_6\right)\right)}\right]$ --, therefor.

In Column 9, Line 63, in Equation, delete "$M_3 = A_4 B_4 + A_5 E_{c0} M_4 = 2\alpha_4 \alpha_6$" and insert -- $M_3 = A_4 B_4 + A_5 E_{c0}, M_4 = 2\alpha_4 \alpha_6$ --, therefor.

In Column 9, Line 65, delete "$M_5 = 2A\,\alpha_4 + \alpha_4 E_{c0} M_6 = A_4 E_{c0}$" and insert -- $M_5 = 2A\,\alpha_4 + \alpha_4 E_{c0}, M_6 = A_4 E_{c0}$ --, therefor.

In Column 11, Line 45, delete "$\in_{xx}$," and insert -- $\in_{xx}$. --, therefor.

In Column 14, Line 2, delete "$K_e$" and insert -- $\kappa_e$ --, therefor.

In Column 15, Line 26, delete "(HDD)," and insert -- (HDDs), --, therefor.

In Column 15, Line 28, delete "(SSD)," and insert -- (SSDs), --, therefor.

In Column 15, Line 38, delete "(DVD)" and insert -- (DVDs) --, therefor.

In Column 18, Line 58, delete "FIG." and insert -- FIGS. --, therefor.

In Column 19, Line 23, delete "11(B)," and insert -- 11(b), --, therefor.

In Column 19, Line 58, delete "training" and insert -- training. --, therefor.

In Column 22, Line 43, delete "12202" and insert -- 1202 --, therefor.

In Column 22, Line 59, delete "108" and insert -- 1208 --, therefor.